(12) United States Patent
Noguchi et al.

(10) Patent No.: US 7,004,046 B2
(45) Date of Patent: Feb. 28, 2006

(54) GEAR MADE OF RESIN, IMAGE FORMING DEVICE HAVING THE RESIN GEAR AND ROTARY GEARING DEVICE MADE OF RESIN

(75) Inventors: Kouji Noguchi, Kawaguchi (JP); Kazuyuki Sakamaki, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/820,672

(22) Filed: Apr. 8, 2004

(65) Prior Publication Data
US 2004/0187622 A1    Sep. 30, 2004

Related U.S. Application Data

(62) Division of application No. 09/827,524, filed on Apr. 6, 2001, now Pat. No. 6,752,035.

(30) Foreign Application Priority Data
Apr. 10, 2000 (JP) .............................. 2000-107495
May 30, 2000 (JP) .............................. 2000-160670

(51) Int. Cl.
F16H 55/14 (2006.01)
(52) U.S. Cl. ...................... 74/443; 74/461; 74/DIG. 10
(58) Field of Classification Search .................. 74/443, 74/461, DIG. 10
See application file for complete search history.

(56) References Cited

U.S. PATENT DOCUMENTS

| 3,361,004 | A |   | 1/1968  | Williams et al. |
| 3,406,583 | A |   | 10/1968 | Baier |
| 4,413,981 | A |   | 11/1983 | White et al. |
| 5,307,705 | A |   | 5/1994  | Fenelon |
| 5,452,622 | A |   | 9/1995  | Fenelon |
| 5,613,931 | A | * | 3/1997  | Maty ............................ 492/47 |
| 5,812,183 | A | * | 9/1998  | Jeran ........................... 347/262 |
| 5,845,175 | A | * | 12/1998 | Kumar et al. ................ 399/111 |
| 5,863,008 | A |   | 1/1999  | Park |
| 5,890,036 | A | * | 3/1999  | Karakama et al. ........... 399/119 |
| 6,076,419 | A |   | 6/2000  | Mlejnek et al. |

FOREIGN PATENT DOCUMENTS

| JP | 5-18455   | 1/1993  |
| JP | 10-278124 | 10/1998 |

* cited by examiner

*Primary Examiner*—David Fenstermacher
(74) *Attorney, Agent, or Firm*—Koda & Androlia

(57) ABSTRACT

A gear made of a resin including substantially annular toothed portion formed at a radially outer location, a shaft-supporting section formed at a radially inner location around a rotational center of the toothed portion, and a web connecting the shaft-supporting section and the toothed portion to each other. A circumferential rib is formed on the web concentrically with the toothed portion, and diametrical ribs are also formed on the web radiately to connect the circumferential rib and the shaft-supporting section to each other in a radial direction.

5 Claims, 22 Drawing Sheets

GEAR MADE OF RESIN, IMAGE FORMING DEVICE HAVING THE RESIN GEAR AND ROTARY GEARING DEVICE MADE OF RESIN

This is a Divisional Application of application Ser. No. 09/827,524, filed Apr. 6, 2001, now U.S. Pat. No. 6,752,035, which is hereby incorporated in its entirety by reference.

FIELD OF THE INVENTION

The present invention relates to a gear made of a resin widely used in a power-transmitting mechanism such as a duplicator, a printer, a facsimile, an automobile part and the like, and an image-forming device providing an enhanced image quality, such as a duplicator, a printer and the like, which is designed to drive a photoconductor through such gear made of the resin.

The present invention also relates to a gear made of a resin and a pulley made of a resin as a rotation-transmitting means made of a resin.

BACKGROUND OF THE INVENTION

A gear made of a resin is conventionally used in a power-transmitting mechanism such as a duplicator, an automobile part and the like for the purpose of reducing the cost and the weight of the part and reducing an operational sound. Such a gear made of a resin is formed into a predetermined shape by an injection molding, and the shape is contrived to provide a tooth-profile accuracy and a strength suited for the purpose of use.

For example, in an image-forming device such as a color duplicator, a gear made of a resin adapted to be meshed at a high contact rate with a gear made of a resin for driving a photoconductor is used and the shape of this gear is contrived for forming a distinct color image having a high quality. The gear made of the resin is connected to a photoconductor-driving motor (a drive means), so that the rotational force of the photoconductor-driving motor is transmitted smoothly through the gear made of the resin to a photoconductor to turn the photoconductor smoothly and with a high accuracy, thereby effectively preventing a printing failure such as a color shift.

(First Prior Art)

For example, a gear 150 made of a resin shown in FIGS. 1 and 2 is formed into such a shape that an annular toothed portion 152 having teeth 151 formed thereon and a boss (shaft-supporting section) 154 fitted over a shaft 153 are connected to each other by a thin plate-shaped web 155. The web 155 connected to the toothed portion 152 is thinner and hence, the amount of radially inward contractive deformation (shrinkage transformation) of a connection between the web 155 and the toothed portion 152 after the injection molding and a portion in the vicinity of the connection is smaller, whereby a tooth profile can be formed with a higher accuracy. When the thickness of the web 155 connected to the toothed portion 152 is larger, the volume of the web 155 is larger, and the amount of radially inward contractive deformation of the web 155 after the injection molding is larger. For this reason, the connection between the web 155 and the toothed portion and the portion in the vicinity of the connection are deformed in such a manner that they are pulled in a direction of contraction of the web 155 and hence, the amount of toothed portion 152 deformed is larger, resulting in an increased reduction in accuracy of formation of the teeth 151.

On the other hand, when the gear 150 made of the resin as shown in FIGS. 1 and 1 transmits a power in a state in which it has received a radial load WR as shown in FIG. 3, the web 155 is deformed elliptically in an increased amount, as shown by a dotted line in FIG. 3, resulting in a decreased accuracy of transmission of the rotation, because the web 155 receiving the radial load WR has a smaller thickness and a lower strength. When the gear 150 having a sectional shape as shown in FIG. 2 is a helical gear, a thrust load WS is applied to the toothed portion 152 and the web 155 and hence, the web 152 is deformed in a flexed manner in an increased amount in a direction of application of the thrust load WS, as shown by a dotted line in FIG. 4, resulting in a reduction accuracy of transmission of the rotation, because the thickness of the web 155 is smaller.

(Second Prior Art)

Therefore, to eliminate such a disadvantage, a gear 157 made of a resin has been considered which includes radial ribs 156 formed on a side of a web 155 to connect a boss 154 and a toothed portion 152 to each other, as shown in FIGS. 5 to 7, so that the rigidity of the web 155 is increased, and the accuracy of transmission of the rotation is enhanced. In the gear 157 in which the boss 154 and the toothed portion 152 are connected directly to each other by the radial ribs 156, however, the following new disadvantage is brought about: A connection between the radial ribs 156 and the toothed portion 152 and a portion in the vicinity of the connection are contractively deformed radially inwards in an increased amount (shown by a dotted line in each of FIGS. 5 and 6), thereby generating a phenomenon of the falling of the teeth 151 as shown in FIG. 8, resulting in a reduced accuracy of a tooth profile.

(Third Prior Art)

A gear 200 made of a resin as shown in FIGS. 9 and 10 has been developed by the present applicant, wherein such disadvantages associated with the prior arts can be overcome.

The gear 200 made of the resin shown in FIGS. 9 and 10 includes a shaft-supporting section 203 having a shaft hole 202 fitted over a photoconductor driving shaft 201 for rotation in unison with each other, a rim 205 having teeth 204 and located radially outside the shaft-supporting section 203, and a thinner web 206 which connects the shaft-supporting section 203 and the rim 205. In order to prevent the deformation of the web 206 due to a thrust load, this gear 200 made of the resin has first and second annular circumferential ribs 207 and 208 formed inside the rim 205 and on opposite sides of the web 206, diametrical ribs 210 formed radiately on opposite sides of the web 206 between the shaft-supporting section 203 and the second circumferential rib 208 to connect the shaft-supporting section 203 and the second circumferential rib 208 to each other, and diametrical ribs 211 formed radiately on the opposite sides of the web 206 between the first and second circumferential rib 207 and 208 to connect the first and second circumferential rib 207 and 208 to each other.

In the gear 200 made of the resin and having such configuration, the diametrical ribs 210 and 211 are not connected to the rim 205 and hence, the rigidity of the web 206 can be increased without detraction of the roundness of the rim 205 having the teeth 204. The gear 200 made of the resin is formed into a shape shown in FIGS. 9 and 10 by an injection molding and hence, as the thickness of the resin is larger, a longer time is taken to cool the resin within a cavity, and the amount of resin contractively deformed is increased more. Therefore, in the gear 200 made of the resin having such shape, if the thickness of the web 206 is larger, the thickness of the connection between the web 206 and the rim 205 is larger, and the amount of radially inward contractive deformation of the connection between the web 206 and the rim 205 is larger than those of other portions, resulting in a degraded tooth profile accuracy. If the diametrical ribs 212 are connected to the rim 213, as shown in FIG. 11, the thickness of the connection between the diametrical ribs 212 and the rim 213 is larger, and the amount of radially inward contractive deformation of the connection between the diametrical ribs 212 and the rim 213 is larger than those of other portions (see a portion shown by a dotted line in FIG. 11), resulting in a reduced roundness. Therefore, the conventional gear 200 made of the resin shown in FIGS. 9 and 10 is formed so that the thickness of the web 206 is decreased as much as possible to provide a desired accuracy of the teeth 204, and the lack of the rigidity of the web 206 can be compensated for by the first and second circumferential ribs 207 and 208 and the diametrical ribs 210 and 211.

In recent years, in an image-forming device such as a color printer, a color duplicator and the like, a small error of the rotation-transmitting accuracy of each of the gears 157 and 200 made of the resin appears as a color shift. Therefore, to prevent the color shift to enable a further clear or distinct printing, it is necessary to rotate the photoconductor more smoothly and with a higher accuracy than those in the prior art to enhance the accuracy of formation of an image on the photoconductor. Here, what exerts a large influence to the accuracy of rotation of the photoconductor is the accuracy of the gear made of the resin, as described above.

In the conventional gear 200 made of the resin, however, the following has been made clear: The rim 205 having the teeth 204 is deformed due to a torque applied during transmission of a power, so that it is displaced in a rotational direction with respect to the shaft-supporting section 203. Particularly, the deformation of a portion between the shaft-supporting section 203 and the second circumferential rib 208 is larger than those of other portions, and the diametrical ribs 210 formed around the outer periphery of the shaft-supporting section 203 are deformed as shown by the dotted line. For this reason, a lag is produced between the rotation transmitted from the photoconductor-driving motor (not shown) to the helical gear 200 made of the resin and the rotation transmitted from the gear 200 made of the resin to the photoconductor-driving shaft 201, and a reduction in an image quality such a color shift and the like is brought about due to the lag between the rotations.

The recent image-forming device such as a color printer, a color duplicator and the like is disposed and used beside a desk in many cases and for this reason, it is required that the image-forming device is designed so that a vibration during operation and a noise due to the vibration can be reduced to maintain a quiet environment in a working place.

SUMMARY OF THE INVENTION

Accordingly, it is an object of the present invention to contrive the shape of the gear made of the resin exerting a large influence to the accuracy of rotation of the photoconductor to enhance the dynamic accuracy of the gear made of the resin, thereby further enhancing the image quality in the image-forming device and reduce the noise due to the vibration and the like during operation.

To achieve the above object, the present invention provides a gear made of a resin comprising a substantially annular toothed portion formed at a radially outer location, a shaft-supporting section formed at a radially inner location around a rotational center of the toothed portion, and a web connecting the shaft-supporting section and the toothed portion to each other. The web has a circumferential rib formed thereon concentrically with the toothed portion, and diametrical ribs formed radiately thereon to connect the circumferential rib and the shaft-supporting section to each other in a radial direction. In addition, a cross brace is formed on the web on the side of an inner peripheral surface of the circumferential rib.

The present invention also provides a gear made of a resin comprising a substantially cylindrical toothed portion formed at a radially outer location, a shaft-supporting section formed at a radially inner location around a rotational center of said toothed portion, and a thin plate-shaped web connecting said shaft-supporting section and said toothed portion to each other. A circumferential rib is formed on the web concentrically with the toothed portion inside the toothed portion. A plurality of diametrical ribs are also formed on the web to extend obliquely outwards from an outer periphery of the shaft-supporting section and diametrically connect the circumferential rib and the shaft-supporting section to each other along a side of the web, so that it receives a compressive force at the start of transmission of a power.

Further, the present invention provides a gear made of a resin comprising a substantially cylindrical toothed portion formed at a radially outer location, a shaft-supporting section formed at a radially inner location around a rotational center of the toothed portion, and a thin plate-shaped web connecting the shaft-supporting section and the toothed portion to each other. A circumferential rib is formed on the web concentrically with the toothed portion inside the toothed portion. Each of diametrical ribs formed to diametrically connect the circumferential rib and the shaft-supporting section to each other along a side of the web comprise a first diametrical rib portion formed to extend obliquely in a direction opposite from a normal rotational direction from an outer periphery of the shaft-supporting section, and a second diametrical rib portion formed to extend obliquely in a direction opposite from an opposite rotational direction from the outer periphery of the shaft-supporting section.

Further, the present invention provides a gear made of a resin comprising a substantially cylindrical toothed portion formed at a radially outer location, a shaft-supporting section formed at a radially inner location around a rotational center of the toothed portion, and a thin plate-shaped web connecting the shaft-supporting section and the toothed portion to each other. A first circumferential rib is formed on the web concentrically with the toothed portion inside the toothed portion, and a second circumferential rib is also formed on the web concentrically with the first circumferential rib inside the first circumferential rib. A plurality of diametrical ribs are formed to extend obliquely outwards from an outer periphery of the second circumferential rib and connect the second circumferential rib and the first circumferential rib to each other along a side of the web, so that it receives a compressive force at the start of transmission of a power.

Yet further, the present invention provides a gear made of a resin comprising a substantially cylindrical toothed portion formed at a radially outer location, a shaft-supporting section formed at a radially inner location around a rotational center of the toothed portion, and a thin plate-shaped web connecting the shaft-supporting section and the toothed portion to each other. A first circumferential rib is formed on the web concentrically with the toothed portion inside the toothed portion, and a second circumferential rib is also formed on the web concentrically with the first circumferential rib inside the first circumferential rib. Each of diametrical ribs formed to diametrically connect the second circumferential rib and the first circumferential rib to each other along a side of the web comprise a first diametrical rib portion formed to extend obliquely in a direction opposite from a normal rotational direction from an outer periphery of the second circumferential rib, and a second diametrical rib portion formed to extend obliquely in a direction opposite from an opposite rotational direction from the outer periphery of the second circumferential rib.

Yet further, the present invention provides a gear made of a resin comprising a substantially cylindrical toothed portion formed at a radially outer location, a shaft-supporting section formed at a radially inner location around a rotational center of the toothed portion, and a thin plate-shaped web connecting the shaft-supporting section and the toothed portion to each other. A plurality of diametrical ribs are formed on the web to extend obliquely outwards from an outer periphery of the shaft-supporting section and connect the toothed portion and the shaft-supporting section to each other along a side of the web, so that it receives a compressive force at the start of transmission of a power.

With the gear formed as described above according to the present invention, the web is reinforced by the circumferential rib and the diametrical ribs and reinforced by the cross brace, whereby the rigidity of the web can be increased without increasing of the thickness of the web. Therefore, the toothed portion can be formed at a high accuracy, and the rotation-transmitting accuracy (dynamic accuracy) can be enhanced, while reducing the deformation due to an external force (for example, a variation in circular dimension of a pitch), i.e., while maintaining an accuracy of profile of the toothed portion (dynamic accuracy). In the gear made of the resin according to the present invention, it is possible to reduce the torsional vibration due to a rotation-transmitting force and the flexural vibration due to a thrust force (which is a force applied in a direction of a rotational axis and perpendicular to a rotational direction) to reduce a noise due to these vibrations, because the web is reinforced by the circumferential rib and the diametrical ribs and reinforced by the cross brace, and the rigidity of the web is larger against the external force. The diametrical ribs are formed to receive the compressive force at the start of the transmission of the power, and even if the toothed portion is about to be displaced in the rotational direction relative to the shaft-supporting section due to a variation in torque applied during transmission of the rotation, a resisting force for inhibiting such displacement is generated diametrically. Therefore, it is possible to effectively inhibit the toothed portion from being displaced in the rotational direction relative to the shaft-supporting section, thereby inhibiting a variability in angular speed of rotation of the tooth portion and the shaft-supporting section. Thus, with the gear made of the resin according to the present invention, it is possible to transmit the rotation smoothly and with a high accuracy. Further, the gear made of the resin includes the first diametrical rib portions formed to extend obliquely in the direction opposite from the normal rotational direction, and the second diametrical rib portions formed to extend obliquely in the direction opposite from the opposite rotational direction and hence, the rotations in the normal and opposite directions can be transmitted smoothly and with a high accuracy.

The present invention further provides an image-forming device comprising a gear made of a resin according to the present invention, and a drive means for driving a photoconductor in rotation through the gear made of the resin.

Further, the present invention provides an image-forming device comprising a gear made of a resin according to the present invention, and a drive means for driving a photoconductor comprising a rotary drum in rotation through the gear made of the resin, wherein the center of rotation of the gear made of the resin and the center of rotation of the rotary drum is located coaxially with each other, and the gear made of the resin and the rotary drum are connected to each other, so that they can be turned in unison with each other.

With the image-forming device formed as described above according to the present invention, the rotation of the drive means is transmitted through the gear made of the resin according to the present invention to drive the photoconductor in rotation with a high accuracy. Therefore, the high-accuracy and quiet formation of the image can be achieved. More specifically, the image-forming device includes the gear made of the resin excellent in rotation-transmitting accuracy and hence, the rotation of the drive means is transmitted to the photoconductor smoothly and with a high accuracy. Therefore, it is possible to inhibit a variation in angular speed of rotation of the photoconductor to inhibit a color shift in a color image having various colors and formed on the photoconductor, thereby enabling the printing of a distinct color image.

Yet further, the present invention provides a rotation-transmitting means made of a resin, comprising a substantially annular toothed portion formed at a radially outer location, a shaft-supporting section formed at a radially inner location around a rotational center of the toothed portion, and a thin plate-shaped web connecting the shaft-supporting section and the toothed portion to each other. A plurality of diametrical ribs are formed on the web concentrically with the toothed portion, and diametrical ribs are also formed radiately on the web to radially connect the circumferential rib and the shaft-supporting section to each other. A cross brace is also formed on the web on the side of an inner peripheral surface of the circumferential rib. The rotation-transmitting means includes not only a gear made of a resin, but also a pulley made of a resin and having teeth adapted meshed with a timing belt.

Yet further, the present invention provides a rotation-transmitting means made of a resin, comprising a substantially annular toothed portion formed at a radially outer location, a shaft-supporting section formed at a radially inner location around a rotational center of the toothed portion, a thin plate-shaped web connecting the shaft-supporting section and the toothed portion to each other, and diametrical ribs formed radiately on the web to extend from the shaft-supporting section toward the toothed portion, the diametrical ribs being formed to extend obliquely outwards from the shaft-supporting section, so that it receives a compressive force at the start of transmission of a power.

With the rotation-transmitting means formed as described above according to the present invention, the web is reinforced by a circumferential rib and the diametrical ribs and also reinforced by a cross brace formed on the web on the side of an inner peripheral surface of the circumferential rib. As a result, in the rotation-transmitting means made of the resin according to the present invention, the rigidity of the web can be increased, even if the thickness of the web is not increased. Therefore, according to the present invention, the tooth profile accuracy cannot be injured by increasing the rigidity of the web. In other words, according to the present invention, the rotation-transmitting accuracy (dynamic accuracy) can be enhanced, while maintaining an accuracy (static accuracy) of a profile of the toothed portion. Moreover, according to the present invention, it is possible to reduce the vibration and reduce the noise due to the vibration by increasing the rigidity of the web.

BRIEF DESCRIPTION OF THE DRAWINGS

FIG. 33b is an enlarged view of a portion of the gear shown in FIG. 33a;

FIG. 34 is a sectional view of the gear, taken along a line E—E in FIG. 33a;

DESCRIPTION OF THE PREFERRED EMBODIMENTS

The present invention will now be described by way of embodiments with reference to the accompanying drawings.

(Gear Made of Resin)

[First Embodiment]

Figure 13:
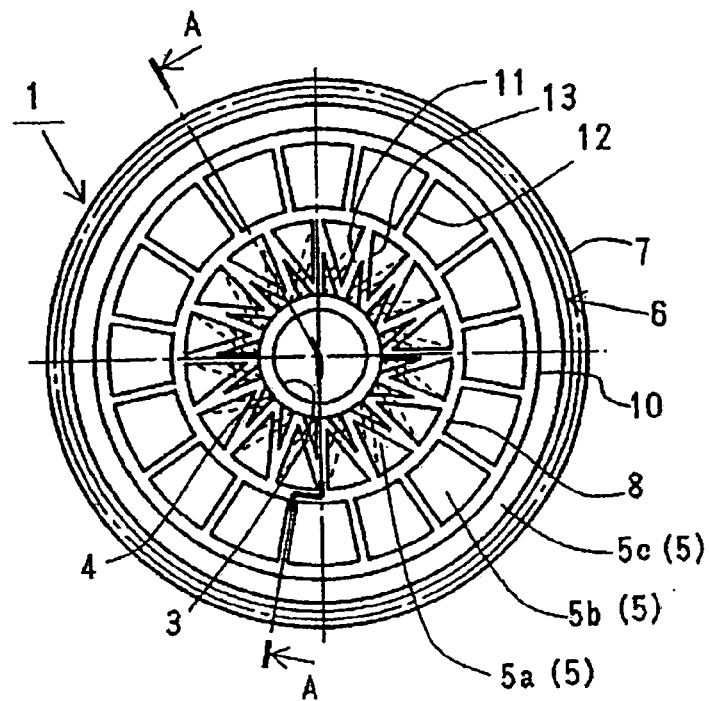
FIG. 13 is a front view of a gear made of a resin according to a first embodiment of the present invention.
Figure 14:
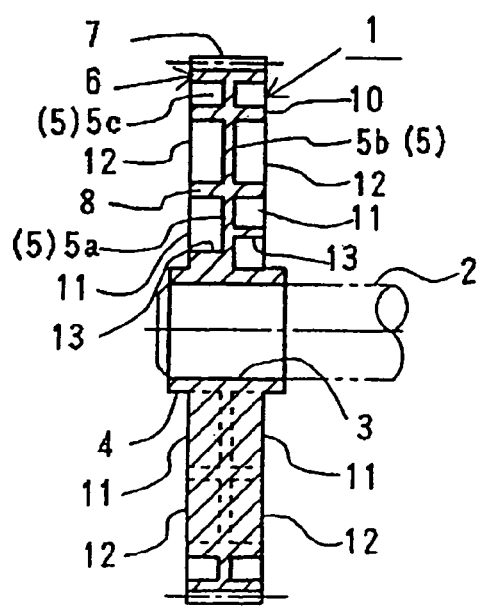
FIG. 14 is a sectional view of the gear made of the resin, taken along a line A—A in FIG. 13.
Figure 15:
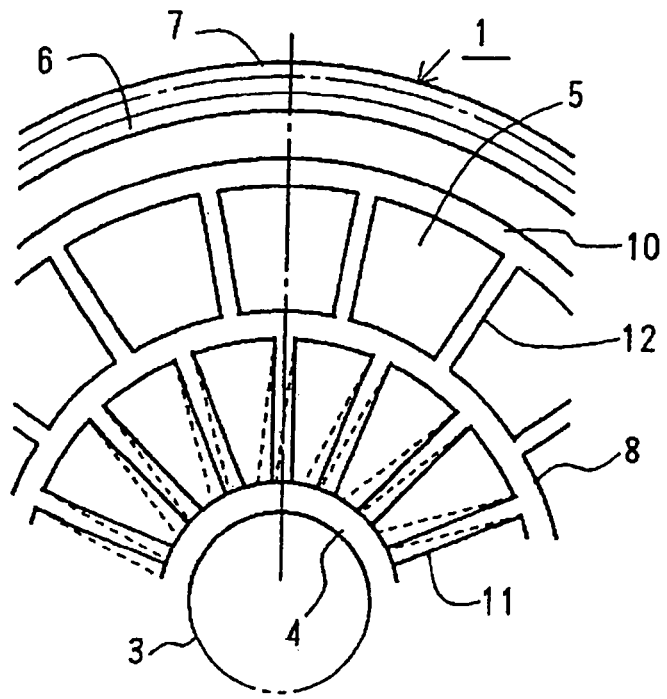
FIG. 15 is a front view of a modification to the prior art corresponding to the gear shown in FIG. 13.

FIGS. 13 to 15 show a gear 1 made of a resin according to an embodiment of the present invention. As shown in FIGS. 13 to 15, the gear 1 is made by an injection molding using a resinous material such as a polyacetal, a polyamide, a polyphenylene sulfide, a polybutylene terephthalate and the like, and includes a shaft-supporting section 4 having a shaft hole 3 defined therein and engaged with a shaft 2, webs 5 formed to extend radially outwards from an outer surface of the shaft-supporting section 4, and a substantially annular toothed portion 6 connected to the shaft-supporting section 4 by the webs 5. Teeth 7 having a corrugated shape suited for the purpose of use are formed around an outer periphery of the toothed portion 6. In the gear 1 made of the resin according to the present embodiment, the shaft hole 3 in the shaft-supporting section 4 is fitted with the shaft 2 in a state in which it has been prevented from being turned with respect to the shaft 2 by a well-known means such as a key, a spline and the like, so that the shaft hole 3 can be turned in unison with the shaft 2.

A first substantially annular circumferential rib 8 is formed concentrically with the toothed portion 6 on each of opposite sides of the web 5 around the outer periphery of the shaft-supporting section 4. A second substantially annular circumferential rib 10 is formed concentrically with the fist circumferential rib 8 on each of opposite sides of the web 5 between the first circumferential rib 8 and the toothed portion 6.

A plurality of first diametrical ribs 11 are formed radiately on each of the opposite sides of the web 5a between the shaft-supporting section 4 and the first circumferential rib 8 to connect an outer surface of the shaft-supporting section 4 and an inner peripheral surface of the first circumferential rib 8 to each other. A plurality of second diametrical ribs 12 are formed radiately on each of the opposite sides of the web 5b between the second circumferential rib 10 and the first circumferential rib 8 to connect an inner surface of the second circumferential rib 10 and an outer peripheral surface of the first circumferential rib 8 to each other.

A single cross brace 13 is formed on each of sides of the web 5a surrounded by the shaft-supporting section 4, the fist circumferential rib 8 and the adjacent first diametrical ribs 11, 11. The cross brace 13 on a surface in FIG. 13 is formed so as to be inclined in the same direction. On the other hand, the cross brace 13 on a back in FIG. 13 is formed so as to be inclined in an opposite direction from that on the surface. The position of cross brace 13 formed on the back is shown by a dashed line in FIG. 13.

The gear 1 formed in the above manner is meshed with another gear made of a resin (not shown), and when the rotation of the gear 1 is transmitted from the gear (not shown) to the shaft 2, a force in a rotational direction is applied to the toothed portion 6 (the first circumferential rib 8), on the one hand, and a resisting force in an opposite direction from the rotational direction is applied to the shaft-supporting section 4, on the other hand. As a result, the shaft-supporting section 4 is about to be displaced in the direction opposite from the rotational direction relative to the first circumferential rib 8 (see FIG. 15). In this case, however, the cross braces 11, 11 formed on the surfaces and backs of the web 5 function to retain the shape defined by the shaft-supporting section 4, the first circumferential rib 8 and the adjacent first diametrical ribs 11, 11, thereby inhibiting the shaft-supporting section 4 from being displaced in the opposite direction from the rotational direction relative to the first circumferential rib 8. Therefore, in the gear 1 made of the resin according to the present embodiment, even if the torque is varied during transmission of the power, the offsetting between the directions of rotation of the shaft-supporting section 4 and the toothed portion 6 can be reduced, thereby increasing the rotation-transmitting accuracy over the prior art. In the gear 1 made of the resin, a compressive force is applied to one of the cross braces 13, 13 formed on the surfaces and backs of the web 5, while a tensile force is applied to the other of the cross braces 13, 13 formed on the surfaces and backs of the web 5, during transmission of the power.

In the gear 1 made of the resin according to the present embodiment, a thrust force or a radial force is applied to the toothed portion 6 during transmission of the power. However, the amount of webs 5 deformed by an external force can be decreased, thereby increasing the rotation-transmitting accuracy over the prior art, because the webs 5 are reinforced by the first and second circumferential ribs 8 and 10, the first and second diametrical ribs 11 and 12 and the cross braces 13.

In the gear 1 made of the resin according to the present embodiment, it is possible to provide an increase in rigidity of the webs 5 without an increase in thickness of the webs 5, because the webs 5 are reinforced by the first and second circumferential ribs 8 and 10, the first and second diametrical ribs 11 and 12 and the cross braces 13. Therefore, in the gear 1 made of the resin according to the present embodiment, a disadvantage of degradation in tooth profile accuracy (static accuracy) due to the contractive deformation of the connection between the web 5c and the toothed portion 6 and the portion in the vicinity of the connection cannot be brought about.

In the gear 1 made of the resin according to the present embodiment, the thickness of the web 5 (5c) connecting the toothed portion 6 and the second circumferential rib 10 can be decreased by an amount corresponding to the fact that the web 5 is reinforced by the first and second circumferential ribs 8 and 10, the first and second diametrical ribs 11 and 12 and the cross braces 13, thereby providing a further enhancement in tooth profile accuracy.

In the gear 1 made of the resin according to the present embodiment, the rigidities of the first circumferential rib 8, the second circumferential rib 10, the first diametrical ribs 11 and the second diametrical ribs 12 are increased, and the rigidity of the web 5 is increased by forming the cross brace 13. Therefore, it is possible to reduce the torsional vibration due to a rotation-transferring force and the flexural vibration due to a thrust force (which is a force applied in a direction of a rotating axis and perpendicular to the rotational direction), thereby reducing a noise due to such vibrations.

The gear 1 made of the resin according to the present embodiment is applicable widely to a spur gear, a helical gear, a worm wheel, a bevel gear, an internal gear and the like.

Figure 16:
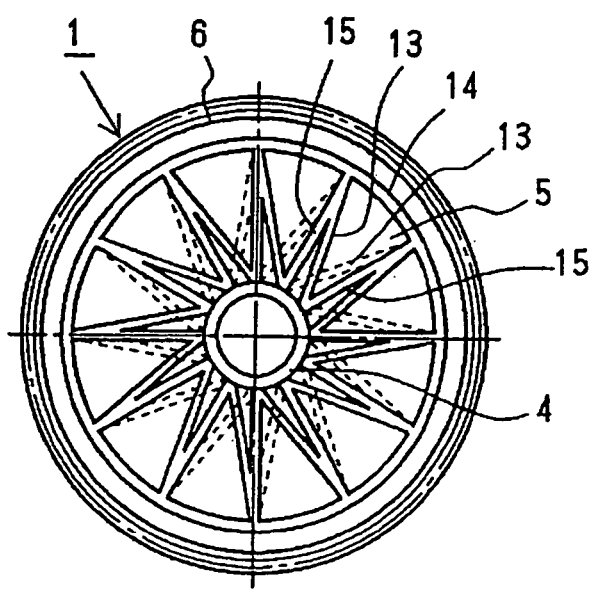
FIG. 16 is a front view of an application of the gear according to the embodiment shown in FIG. 13.

The gear 1 made of the resin according to the present embodiment is formed so that the webs 5 are reinforced by the first and second circumferential ribs 8 and 10 and the first and second diametrical ribs 11 and 12. However, the present invention is not limited to such configuration, and the gear according to the present invention may be a gear formed so that at least a reinforcing circumferential rib 14 is formed between a toothed portion 6 and a shaft-supporting section 4, and diametrical ribs 15, 15 and cross brace 13 are formed radiately on sides of the web between the circumferential rib 14 and the shaft-supporting section 4, as shown in FIG. 16.

In addition, the gear 1 made of the resin according to the present embodiment has been illustrated as the embodiment adapted to transmit the rotation transmitted from the other gear mashed with the gear 1, but may be a gear adapted to transmit the rotation of the shaft 2 to another gear made of a resin and meshed with such gear.

Further, the gear 1 made of the resin according to the present embodiment has been illustrated in the form in which the shaft 2 is fitted in the shaft hole 3 in the shaft-supporting section 4, but the shaft 2 may be integrally formed on the shaft-supporting section.

[Second Embodiment]

Figure 17:
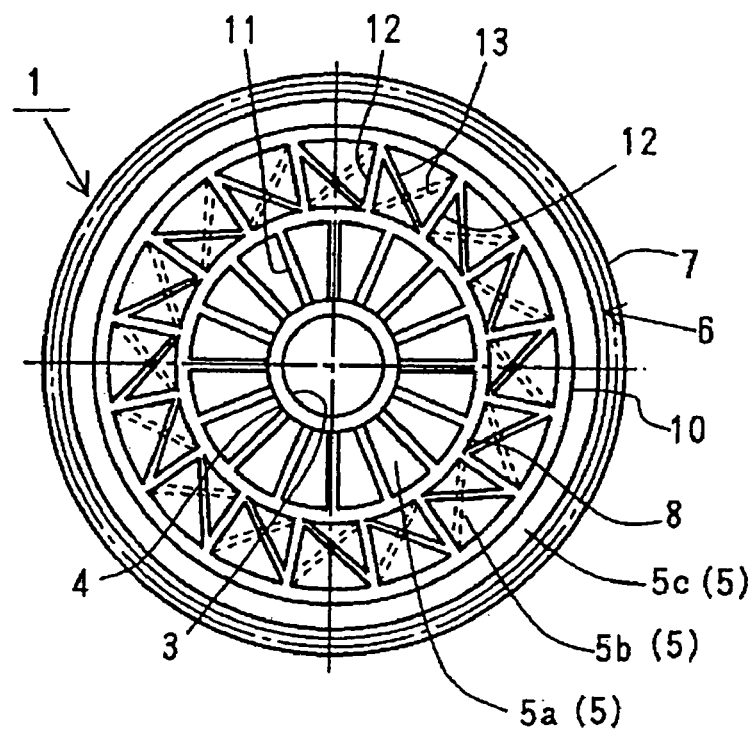
FIG. 17 is a front view of a gear made of a resin according to a second embodiment of the present invention.

FIG. 17 is a front view of a gear 1 made of a resin according to a second embodiment of the present invention. In the present embodiment, portions or components corresponding to those in the first embodiment are designated by like reference characters, and the duplicated description is omitted.

The gear 1 made of the resin according to the second embodiment is used as an idle gear including a shaft 2 fitted in a shaft hole 3 in a shaft-supporting section 4 for rotation relative to each other, and is formed so that the rigidity of a web 5 on the side of a toothed portion 6 is increased. More, specifically, a single cross brace 13 is formed on each of sides of the web 5b surrounded by a first circumferential rib 8, a second circumferential rib 10 and adjacent second diametrical ribs 12, 12, thereby increasing the rigidity of the web 5 on the side of the toothed portion 6. The cross brace 13 on a surface in FIG. 17 is formed so as to be inclined in the same direction. On the other hand, the cross brace 13 on a back in FIG. 17 is formed so as to be inclined in an opposite direction from that on the surface.

Figure 18:
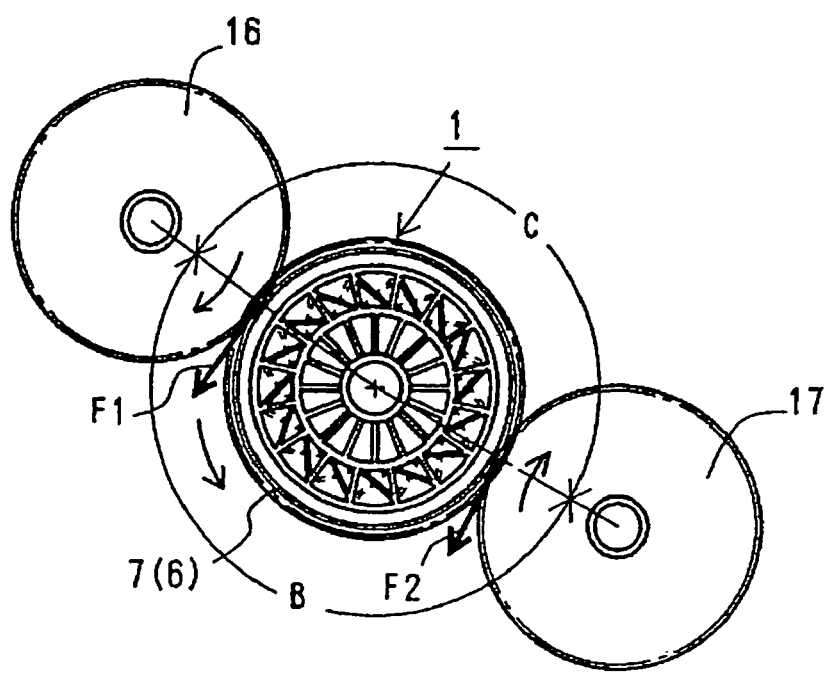
FIG. 18 is a view of the gear used in an application.

The gear 1 formed in the above manner is meshed with another driving gar 16 made of a resin and another driven gear 17 made of a resin, so that the rotation transmitted from the other driving gear 16 is transmitted the other driven gear 17. During this time, a rotational force F1 and a resisting force F2 are applied to the toothed portion 6 of the gear 1 used as an idle gear according to the present embodiment (the first circumferential rib 8), on the one hand, as shown in FIG. 18. As a result, a section of the toothed portion 6 in a range B and a section of the web 5 in the vicinity of the toothed portion 6 are compressed, and a section of the toothed portion 6 in a range C and a section of the web 5 in the vicinity of the toothed portion 6 are tensioned. Therefore, the circular pitch between the teeth 7 in the range B is reduced, and the circular pitch between the teeth 7 in the range C is increased, but the deformation of the toothed portion 6 and the section of the web 5 in the vicinity of the toothed portion 6 can be inhibited by the formation of the cross braces 13 in the above-described manner (see FIG. 17). Namely, the cross braces 13 formed on the surfaces and backs of the web 5 function to retain the shape defined by the first circumferential rib 8, the second circumferential rib 10 and the adjacent second diametrical ribs 12, 12. Therefore, in the gear 1 made of the resin according to the present embodiment, even if the torque is varied during transmission of a power, the change in size of the circular pitch can be inhibited, thereby increasing the rotation-transmitting accuracy (dynamic accuracy) over the prior art.

The gear 1 made of the resin according to each of the above-described embodiments has been illustrated in the form in which the first and second circumferential ribs 8 and 10 and the first and second diametrical ribs 11 and 12 are formed on the opposite sides of the web 5, respectively. The gear 1 is not limited to such form, and the first and second circumferential ribs 8 and 10 and the first and second diametrical ribs 11 and 12 may be formed only on one of the sides of the web 5, and the cross brace 13 may be formed only on one of the sides of the web 5.

Figure 19:
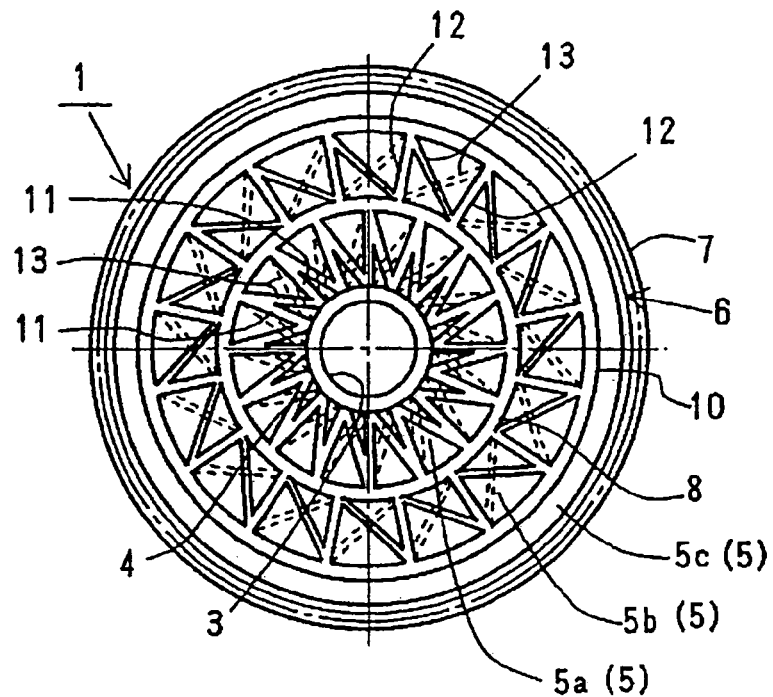
FIG. 19 is a front view showing a first modification to the gear made of the resin according to the first or second embodiment.
Figure 20:
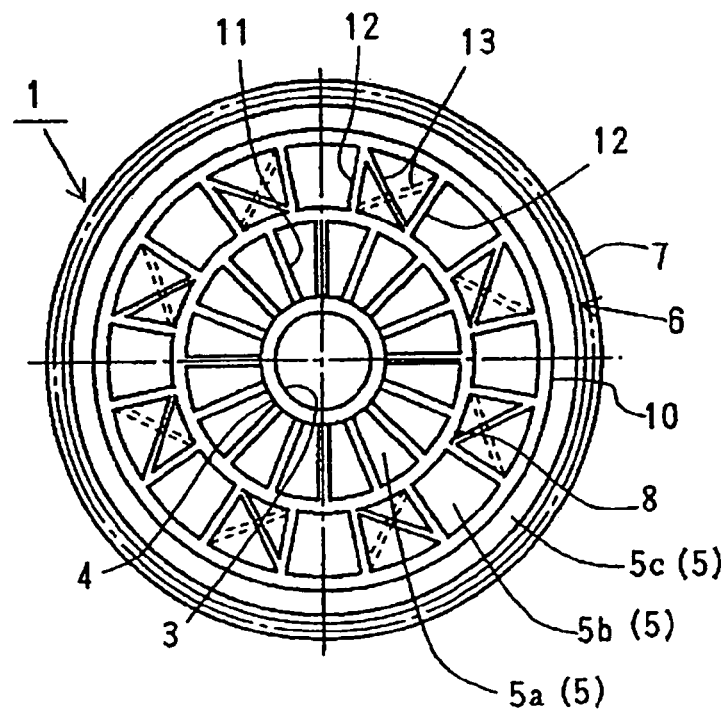
FIG. 20 is a front view showing a second modification to the gear made of the resin according to the second embodiment.

The cross braces 13 may be formed on the side of the web 5a between the shaft-supporting section 4 and the first circumferential rib 8 and on the side of the web 5b between the first circumferential rib 8 and the second circumferential rib 10, respectively, as shown in FIG. 19.

In each of the embodiments, the cross braces are formed all over a region surrounded by shaft-supporting section 4, the first circumferential rib 8 and the first diametrical ribs 11, 11 (see FIG. 13), or all over a region surrounded by the first circumferential rib 8, the second circumferential rib 10 and the second diametrical ribs 12, 12 (see FIG. 17). However, the cross braces are not limited to such arrangement, and for example, the cross braces may be formed at suitable distances in a circumferential direction.

In each of the embodiments, the cross braces are formed so as to be inclined in the opposite directions on the surfaces and backs of the web 5. However, the cross braces are not limited to such arrangement, and may be formed so as to be inclined in the same direction on the surfaces and backs of the web 5.

Figure 21:
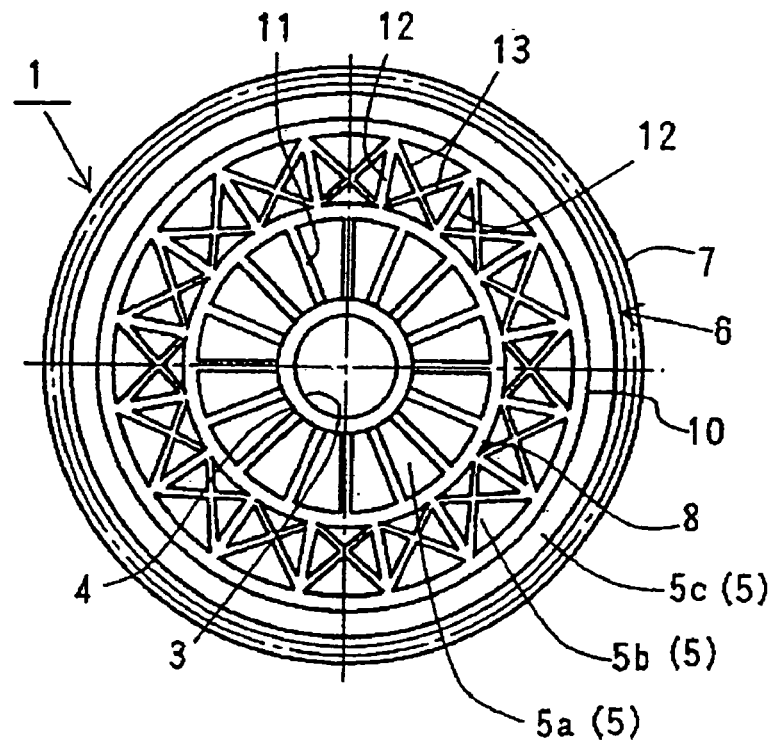
FIG. 21 is a front view showing a third modification to the gear made of the resin according to the second embodiment.

In each of the embodiments, the single cross brace 13 is formed on each of the opposite sides, but the number of the cross brace 13 is not limited to one, and two cross braces may be formed in a crossed manner on each of the opposite sides, as shown in FIG. 21.

Figure 22:
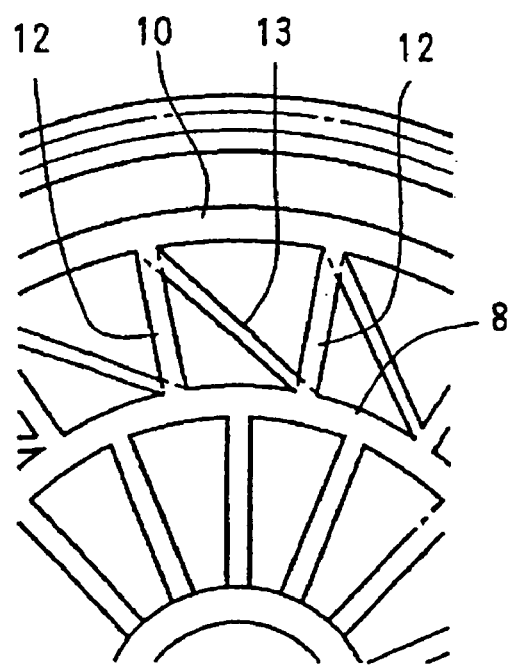
FIG. 22 is an enlarged view of a portion of the gear having a cross brace formed.

It is preferable that the cross brace 13 is formed to connect a lower end of one of the adjacent second diametrical ribs 12, 12 and an upper end of the other second diametrical rib 12, as shown in FIG. 22, for example, in the second embodiment. In other words, it is preferable that the cross brace 13 is formed so that it is diverted from the second diametrical ribs 12, 12 rather than being connected at its upper end directly to the second circumferential rib 10, or being connected at its lower end directly to the first circumferential rib 8.

[Third Embodiment]

Figure 23:
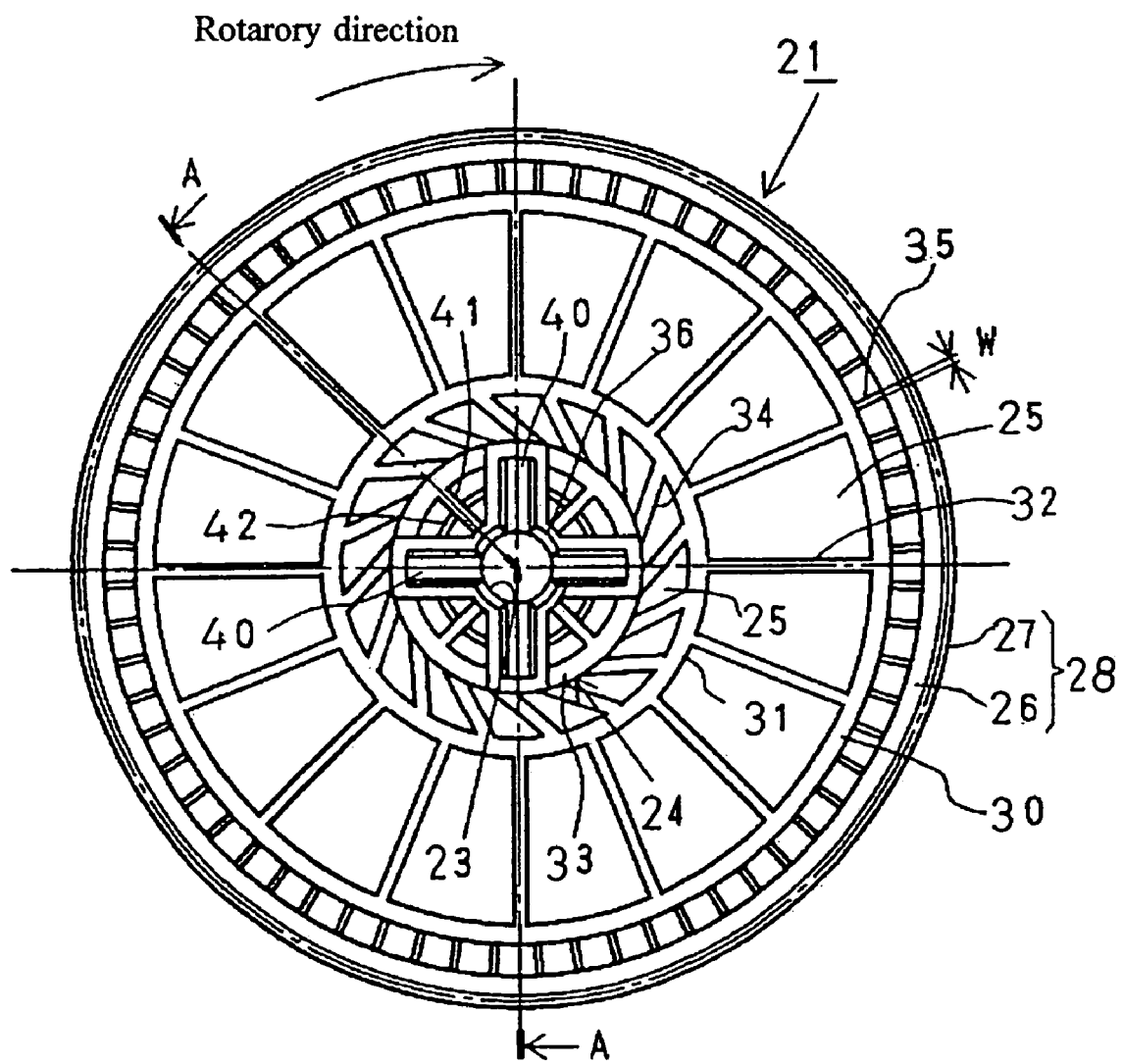
FIG. 23 is a front view of a gear made of a resin according to a third embodiment of the present invention.
Figure 24:
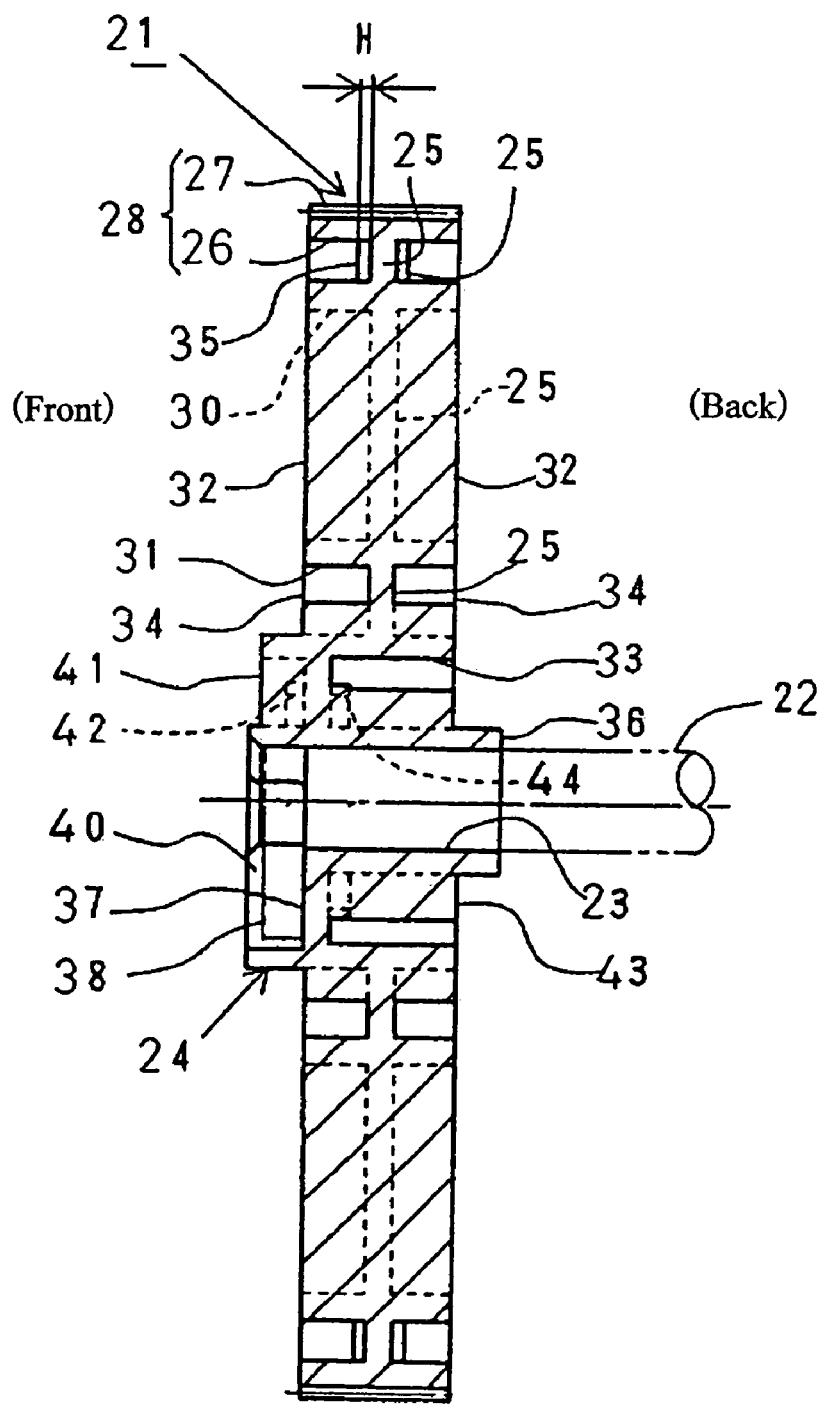
FIG. 24 is a sectional view of the gear, taken along a line A—A in FIG. 23.
Figure 25:
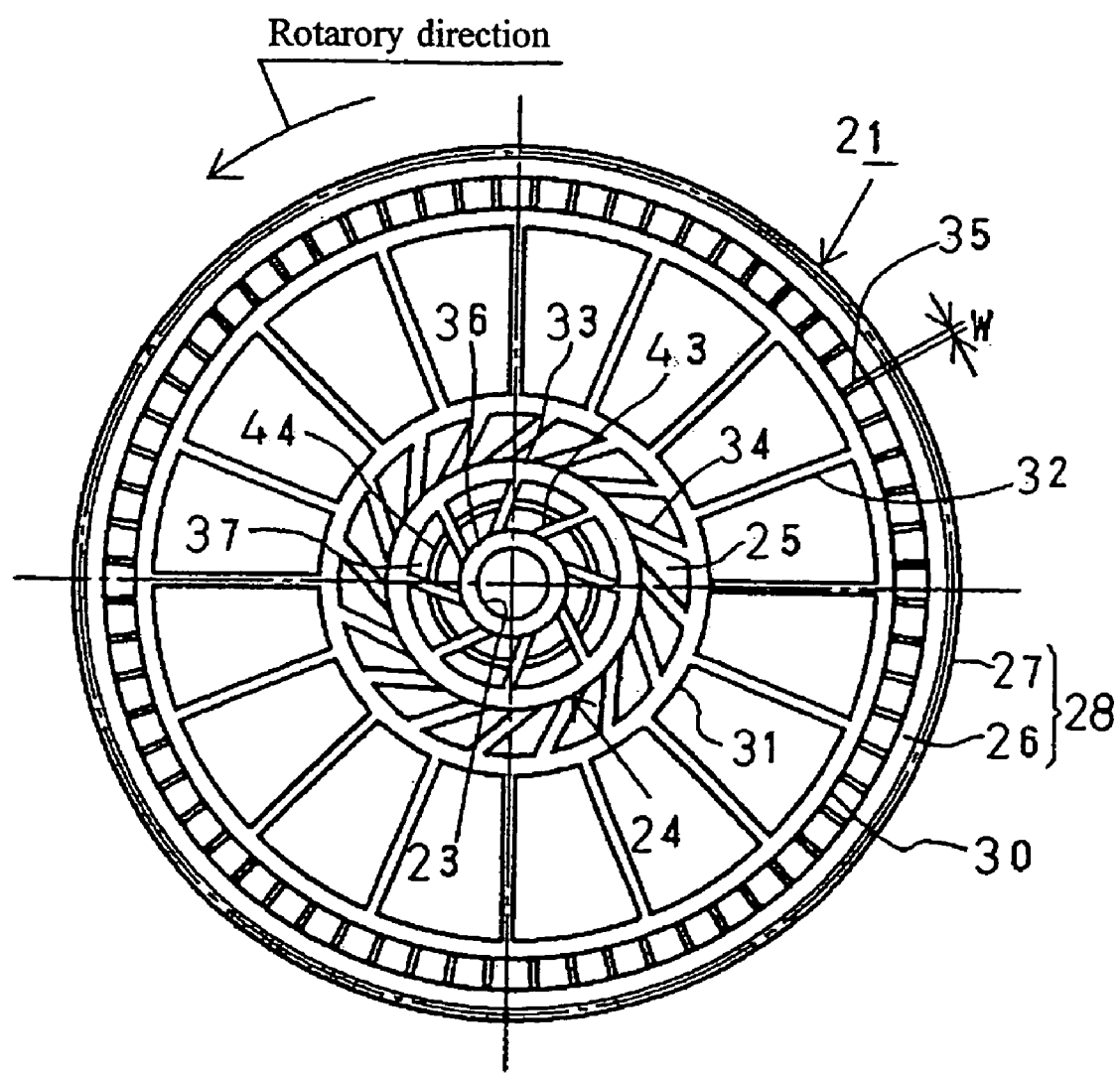
FIG. 25 is a back view of the gear according to the third embodiment of the present invention.

FIGS. 23 to 25 show a gear 1 made of a resin as a gear according to a third embodiment of the present invention. FIG. 23 is a front view of the gear 1 made of the resin (a view of a left side in FIG. 24). FIG. 24 is a sectional view of the gear 1 made of the resin taken along a line A—A in FIG. 23. FIG. 25 is a back view of the gear 21 made of the resin (a view of a right side in FIG. 24).

As shown in FIGS. 23 to 25, the gear 21 is formed by an injection molding using a resinous material such as a polyacetal, a fluorine-added polycarbonate and the like, and includes a shaft-supporting section 24 having a shaft hole 23 defined therein and engaged with a photoconductor-driving shaft 22, a web 25 formed on an outer surface of the shaft-supporting section 24 at an axially substantially central location, and a substantially annular rim 26 connected to the shaft-supporting section 24 by the web 25. Teeth 27 are formed on an outer periphery of the rim 26 formed concentrically with the shaft-supporting section 24. A substantially cylindrical toothed portion 28 is constituted by the rim 26 and the teeth 27.

First annular circumferential ribs 30 concentric with the rim 26 are formed on opposite sides of the web 25 inside the rim 26, respectively. Second annular circumferential ribs 30 concentric with the rim 26 are formed on the opposite sides of the web 25 inside the rim 26 between the first annular circumferential ribs 30 and the shaft-supporting section 24, respectively. The first and second circumferential ribs 30 and 31 are connected to each other by a plurality of diametrical ribs 32 formed radiately on each of the opposite sides of the web 25 between the first and second circumferential ribs 30 and 31.

The second circumferential rib 31 and an outer shell portion 33 of the shaft-supporting section 24 are connected to each other by a plurality of diametrical ribs 34 formed on each of the opposite sides of the web 25 between the second circumferential rib 31 and the outer shell portion 33. The diametrical ribs 34 connecting the second circumferential rib 31 and the outer shell portion 33 is formed so as to be inclined in a direction opposite from the rotational direction of the gear 21 made of the resin, so that when a force in a clockwise direction as viewed in FIG. 23 is applied to the teeth (at the start of the transmission of a power), the diametrical ribs 34 receive a compressive force to produce a reaction force which inhibits the relative rotation of the second circumferential rib 31 and the shaft-supporting section 24.

A plurality of diametrical ribs 35 having width and height dimensions as large as providing no adverse affection to the tooth profile accuracy are formed radiately on each of the opposite sides of the web 25 between the first circumferential rib 30 and the rim 26 to connect the first circumferential rib 30 and the rim 26 to each other. As a result, the rigidity of the web 25 between the first circumferential rib 30 and the rim 26 is increased by the plurality of diametrical ribs 35. The diametrical ribs 35 are formed so that the width dimension W is smaller and the height dimension is lower than those of the other diametrical ribs 32 and 34.

Here, the diametrical ribs 32, 34 and 35 are formed so that they are dislocated circumferentially from one another. More specifically, the diametrical ribs 34 are connected at their outer peripheral ends between connections of the second circumferential ribs 31 and the diametrical ribs 32, 32, and the diametrical ribs 32 are connected at their outer peripheral ends between connections of the first circumferential ribs 30 and the diametrical ribs 35, 35. This is because when the diametrical ribs 34, 32 and 35 are located on the same straight line, there is a possibility that the amount of ribs compressed radially inwards after the injection molding is increased to exert an adverse affection to the roundness of the toothed portion 28. The circumferential ribs 30 and 31 and the diametrical ribs 32, 34 and 35 are formed at symmetric locations on the opposite sides of the web 25, so that the contractive deformation of the after the injection molding are not ununiform on one of the sides and the other side of the web 25. Thus, an injection molding of a high accuracy can be carried out.

The shaft-supporting section 24 includes an inner shell portion 36 having the shaft hole 23 fitted over the photoconductor-driving shaft 22 extending from a photoconductor (not shown), and the outer shell portion 33 formed concentrically with the inner shell portion 36. The outer and inner shell portions 33 and 36 are connected to each other by a web 37. Key grooves 40 are defined in a substantially cross-shape in one (left side in FIG. 24) of sides of the web 37 to engage a detent of the photoconductor-driving shaft 22. Diametrical ribs 41 are also formed on the one side of the web 37 between the key grooves 40, 40 to diametrically connect the inner and outer shell portions 36 and 33 to each other, and circumferential ribs 42 are formed between the key grooves 40, 40 to intersect the diametrical ribs 41. On the other hand, diametrical ribs 43 are formed on the other side (right side in FIG. 24) of the web 37 of the shaft-supporting section 24 to diametrically connect the inner and outer shell portions 36 and 33 to each other, so that they are inclined in a direction opposite from the rotational direction of the gar 21 made of the resin. A circumferential rib 44 is also formed on the other side of the web 37 of the shaft-supporting section 24 to intersect the diametrical ribs 43. In this case, the outer peripheral ends of the diametrical ribs 43 are connected to the outer shell portion 33, so that they are located between the inner peripheral ends of the diametrical ribs 34, 34 located diametrically outside the diametrical ribs 43. The reason is as follows: If the diametrical ribs 43 and 34 are formed so that the positions of the outer peripheral ends of the diametrical ribs 43 are superposed on the positions of the inner peripheral ends of the diametrical ribs 34, connections between the diametrical ribs 43 and 33 and the outer shell portion 33 are larger in thickness than other portions and for this reason, a difference is produced between cooling speeds after the injection molding and hence, it is difficult to form these diametrical ribs 43 and 34 at a high accuracy. The web 37 of the shaft-supporting section 24 is formed at a location closer to the one side having the key grooves 40 defined therein, as shown in FIG. 24. This is for a reason, which will be described below. The detent 38 of the photoconductor-driving shaft 22 is engaged in the key grooves 40 in the shaft-supporting section 24, so that a large torque is applied to one of the sides of the shaft-supporting section 24, and hence, it is necessary to ensure the strength of the one side of the shaft-supporting section 24.

The gear 21 having the above-described structure is formed, so that the webs 26, 25 and 37, the circumferential ribs 30 and 31 and the outer and inner shell portions 36 are formed at the substantially same thickness, and the diametrical ribs 32, 34, 41 and 43 are formed at the thickness equal to or smaller than those of the circumferential ribs 30 and 31, and so that the cooling speeds after the injection molding are substantially the same at the various portions. Therefore, the contractive deformation after the injection molding is uniformized, and thus, the gear 21 is formed at a high accuracy. The circumferential ribs 42 and 44 are formed the substantially same dimensions as the width and height dimensions of the diametrical ribs 35, thereby providing an increase in rigidity without injuring the accuracy of forming the shaft-supporting section 24.

In the gear 21 made of the resin according to the present embodiment, the lightening is achieved sufficiently, leading to a reduction in weight and a decreased amount of contractive deformation after the injection molding, and hence, the entire configuration including the toothed portion 28 can be formed at a high accuracy. In the gear 21 made of the resin according to the present embodiment, however, even if the lightening is achieved as described above, the strength of the web 25 is ensured sufficiently by forming the circumferential ribs 30 and 31 and the diametrical ribs 32, 34 and 35 on the sides of the web 25 and hence, the rotational force input to the toothed portion 28 can be reliably transmitted to the photoconductor-driving shaft 22 engaged with the shaft-supporting section 24.

Figure 1:
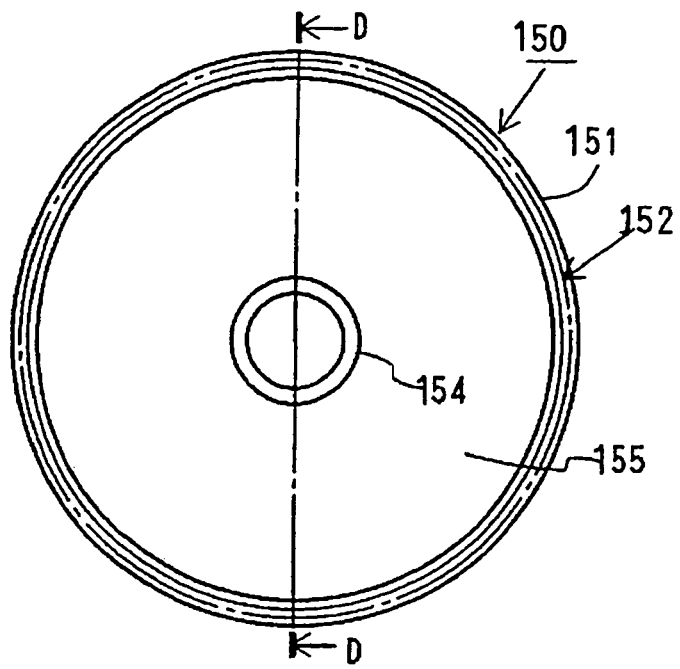
FIG. 1 is a front view of a gear made of a resin in a first prior art.
Figure 2:
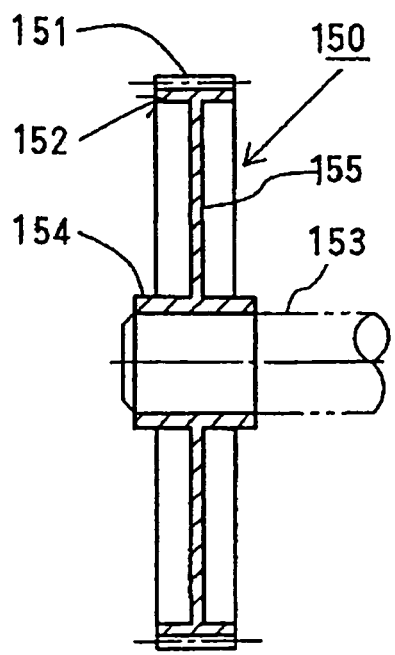
FIG. 2 is a sectional view of the gear made of the resin, taken along a line D—D in FIG. 1.
Figure 3:
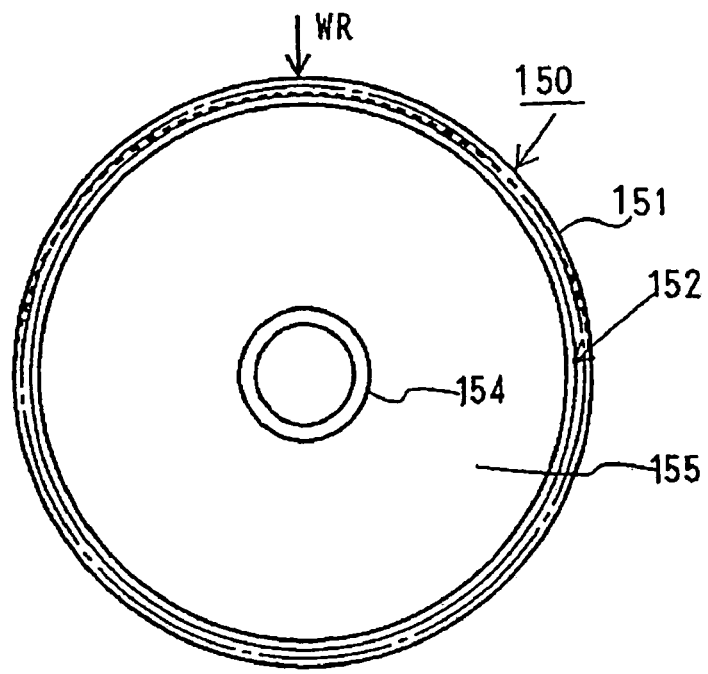
FIG. 3 is a front view showing the deformation of the gear made of the resin in the first prior art due to a radial load.
Figure 4:
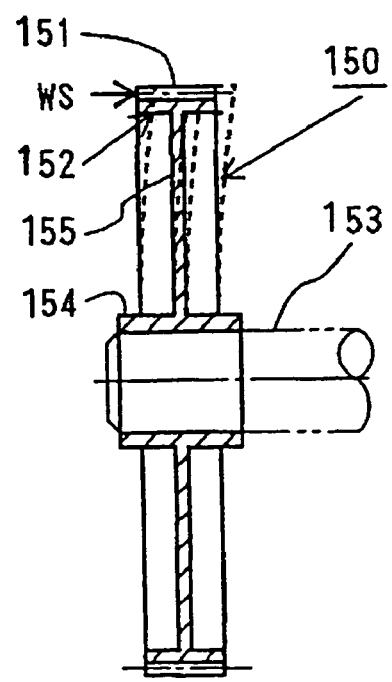
FIG. 4 is a sectional view showing the deformation of the gear made of the resin in the first prior art due to a thrust load.
Figure 5:
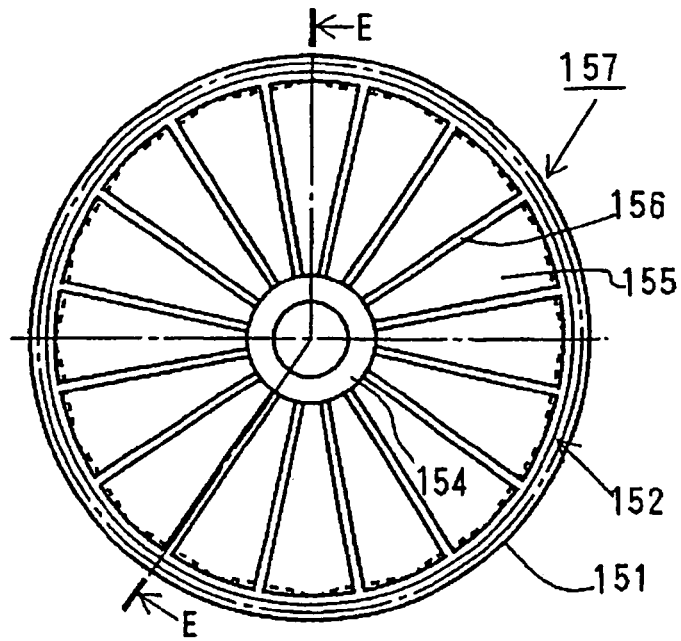
FIG. 5 is a front view of a gear made of a resin in a second prior art.
Figure 6:
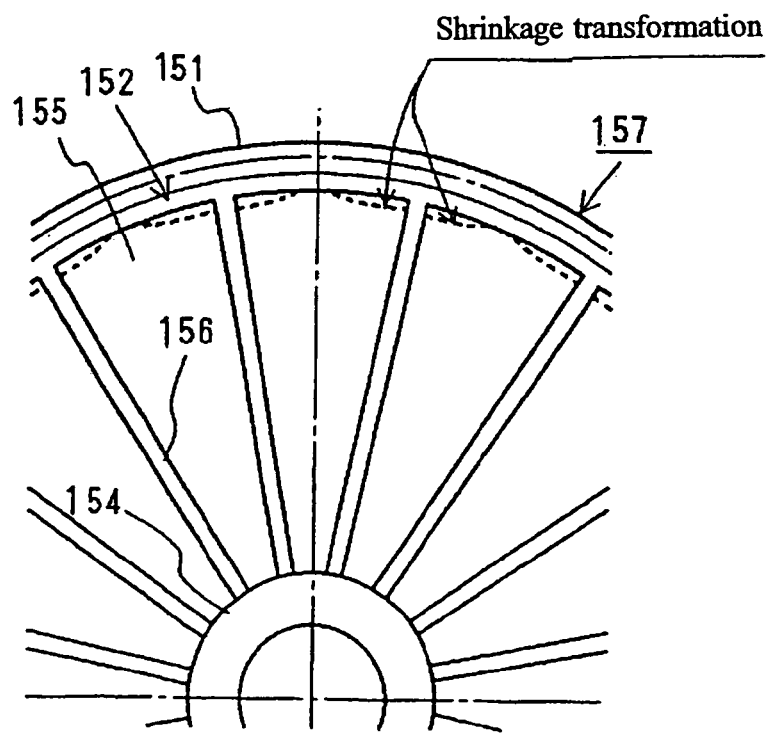
FIG. 6 is an enlarged view of a portion of the gear shown in FIG. 5.
Figure 7:
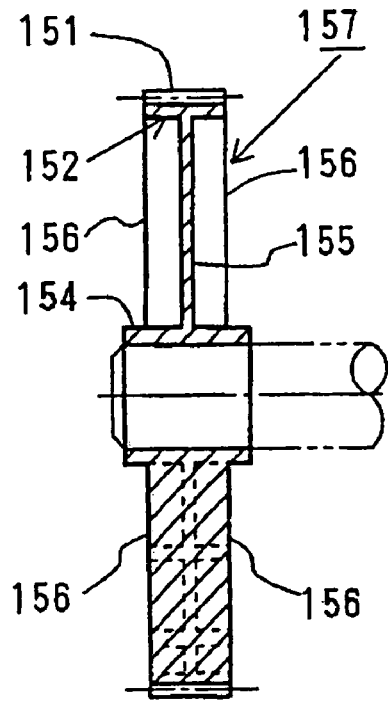
FIG. 7 is a sectional view of the gear made of the resin, taken along a line E—E in FIG. 5.
Figure 8:
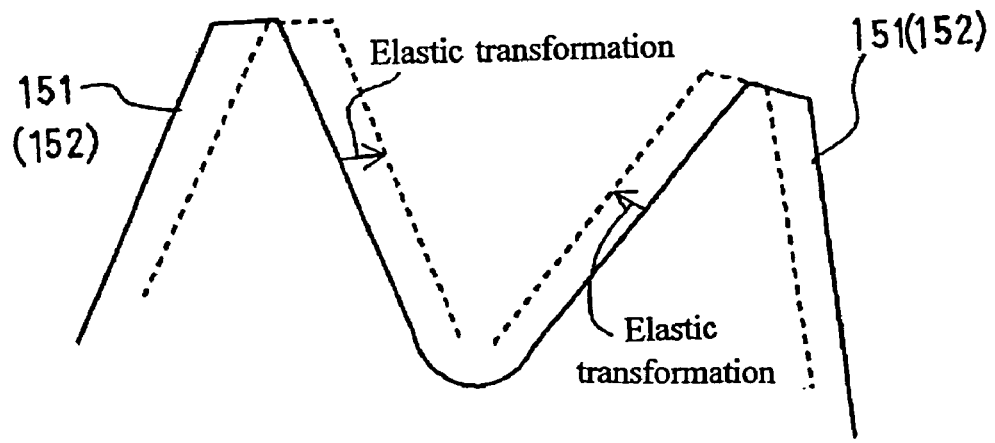
FIG. 8 is an enlarged view showing teeth of the gear in the second prior art in their deformed states.
Figure 9:
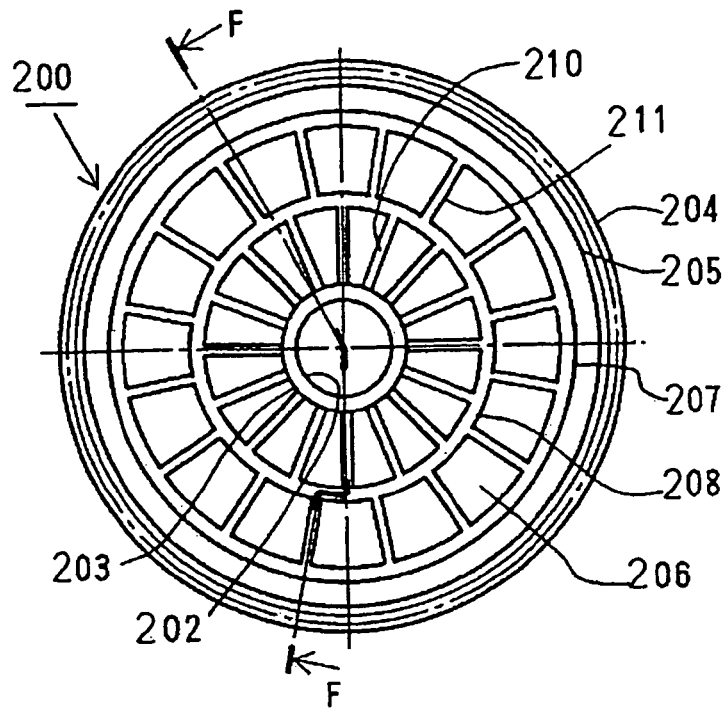
FIG. 9 is a front view of a gear made of a resin in another prior art.
Figure 10:
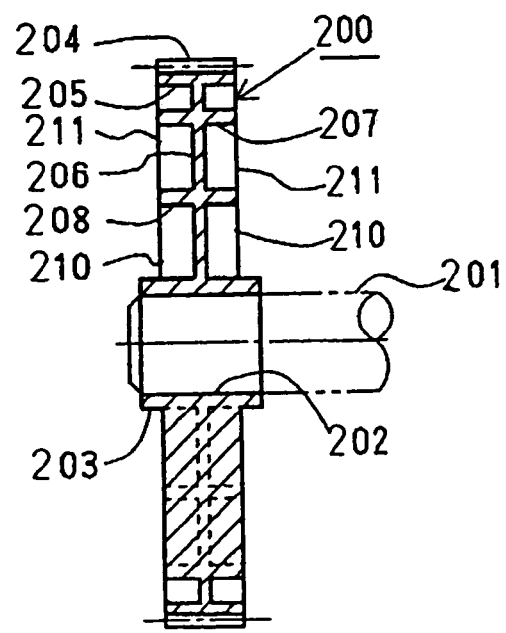
FIG. 10 is a sectional view of the gear taken along a line F—F in FIG. 9.
Figure 11:
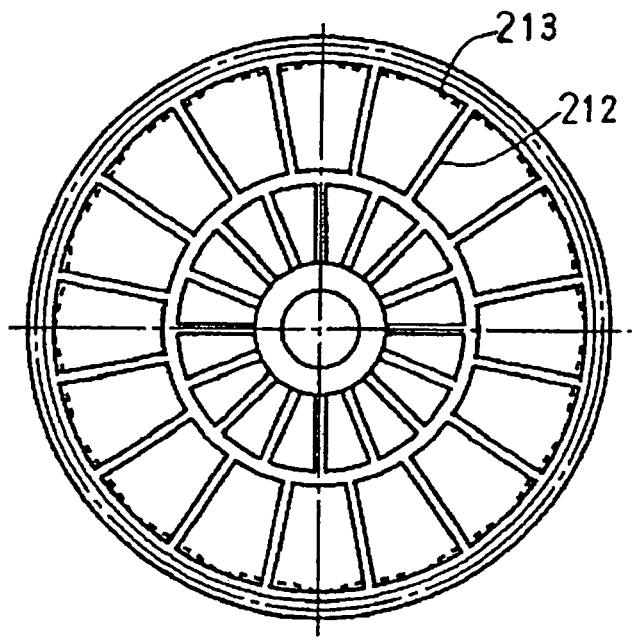
FIG. 11 is a front view of a gear made of a resin in further prior art.
Figure 12:
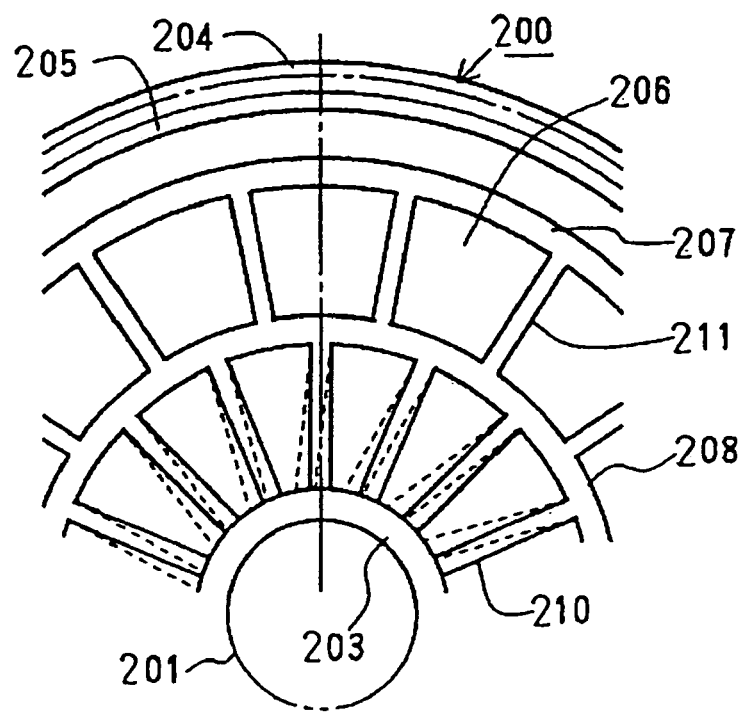
FIG. 12 is an enlarged front view showing a portion of the gear shown in FIG. 9 in a deformed state.

Moreover, in the gear 21 made of the resin according to the present embodiment, the diametrical ribs 34 inclined in the direction opposite from the rotational direction are formed between the shaft-supporting section 24 and the second circumferential rib 31 which is deformed to the largest extent in the rotational direction during transmission of the rotation (see FIG. 12), so that the diametrical ribs 34 produces a reaction force for inhibiting the ununiform deformation in the rotational direction between the second circumferential rib 31 and the shaft-supporting section 24. Therefore, the ununiform deformation (a phase difference between rotations) in the rotational direction between the toothed portion 28 and the shaft-supporting section 24 can be reduced. Thus, the gear 21 made of the resin according to the present embodiment ensures an increase in rotation-transmitting accuracy and enables the photoconductor-driving shaft 22 to be rotated smoothly and with a good accuracy.

In the present embodiment, each of corners of the connections such as the shapes of corners of the connections between the diametrical ribs 32 and 34 and the circumferential rib 31 and the shapes of corners of the connections between the diametrical ribs 34 and the outer shell portion 33 is formed into a radius-face shape to increase the moldability and releasability and to avoid the concentration of a stress.

Alternatively, in the gear 21 made of the resin according to the present embodiment, the diametrical ribs 32 between the first and second circumferential ribs 30 and 31 may be inclined in the direction opposite from the direction of rotation of the gear 21, as are the diametrical ribs 34 between the second circumferential rib 31 and the shaft-supporting section 24.

With the gear 21 formed in the above manner, the rotational-transmitting accuracy can be enhanced more than in the previously described embodiments.

In the gear 21 made of the resin according to the present embodiment, all of the diametrical ribs 32 and 35 may be inclined in the direction opposite from the direction of rotation of the gear 21, as are the diametrical ribs 34 between the second circumferential rib 31 and the shaft-supporting section 24. With the gear 21 formed in the above manner, the rotational-transmitting accuracy can be enhanced more than in the previously described embodiments.

When the gear 21 made of the resin according to the present embodiment is used as an idle gear, only the diametrical ribs 32 may be inclined in the direction opposite from the direction of rotation of the gear 21.

The gear 21 made of the resin according to the present embodiment has been illustrated in the embodiment in which it is engaged with the photoconductor-driving shaft 22 for rotation in unison with the shaft 22. However, the gear 21 is not limited to such embodiment and can be used in an embodiment in which it is rotatably engaged with a support shaft (not shown).

In the present embodiment, the gear 21 made of the resin has been illustrated which is designed so that a power input from the toothed portion 28 is output from the shaft-supporting section 24. Alternatively, the gear 21 made of the resin may be formed so that a power input from the shaft-supporting section 24 is output from the toothed portion 28, and in this case, diametrical ribs 34 are inclined in a direction opposite from the direction of inclination of the diametrical ribs 34 in the previously described embodiment. More specifically, in the gear 21 designed so that the power input from the shaft-supporting section 24 is output from the toothed portion 28, the plurality of diametrical ribs 34 are formed to extend obliquely in the same direction as the rotational direction from the outer periphery of the shaft-supporting section 24. In the gear 21 formed in this manner, the diametrical ribs 34 can receive a compressive force at the start of the transmission of a power and produce a reaction force for inhibiting the offset movements of the shaft-supporting section 24 and the toothed portion 28 in the rotational direction, thereby providing an effect similar to those in the previously described embodiments. In addition, in the gear 21 designed so that the power input from the shaft-supporting section 24 is output from the toothed portion 28, the diametrical ribs 32 and 35 may be inclined in the same direction as the direction of inclination of the diametrical ribs 34.

[Fourth Embodiment]

Figure 26:
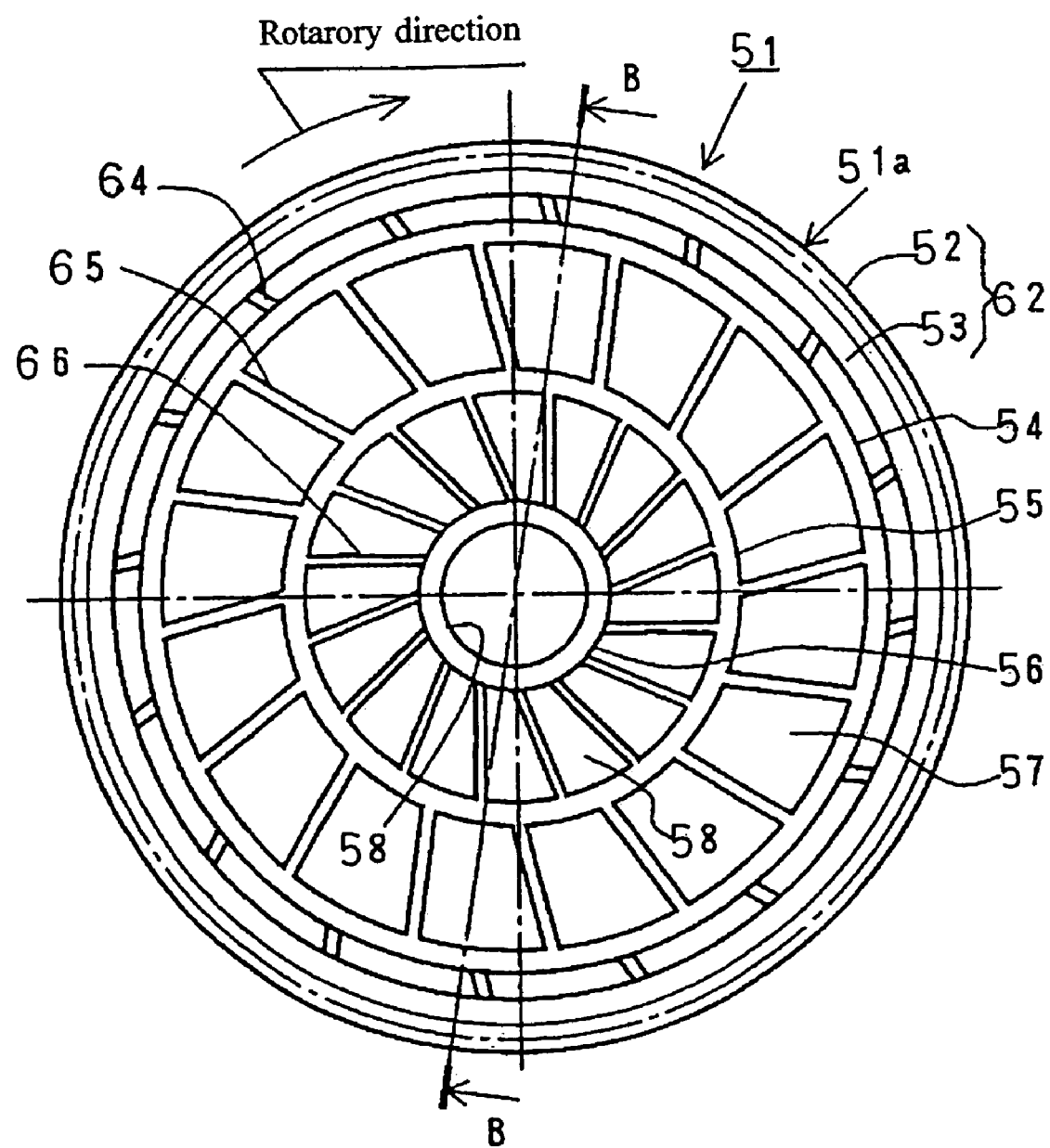
FIG. 26 is a front view of a gear made of a resin according to a fourth embodiment of the present invention.
Figure 27:
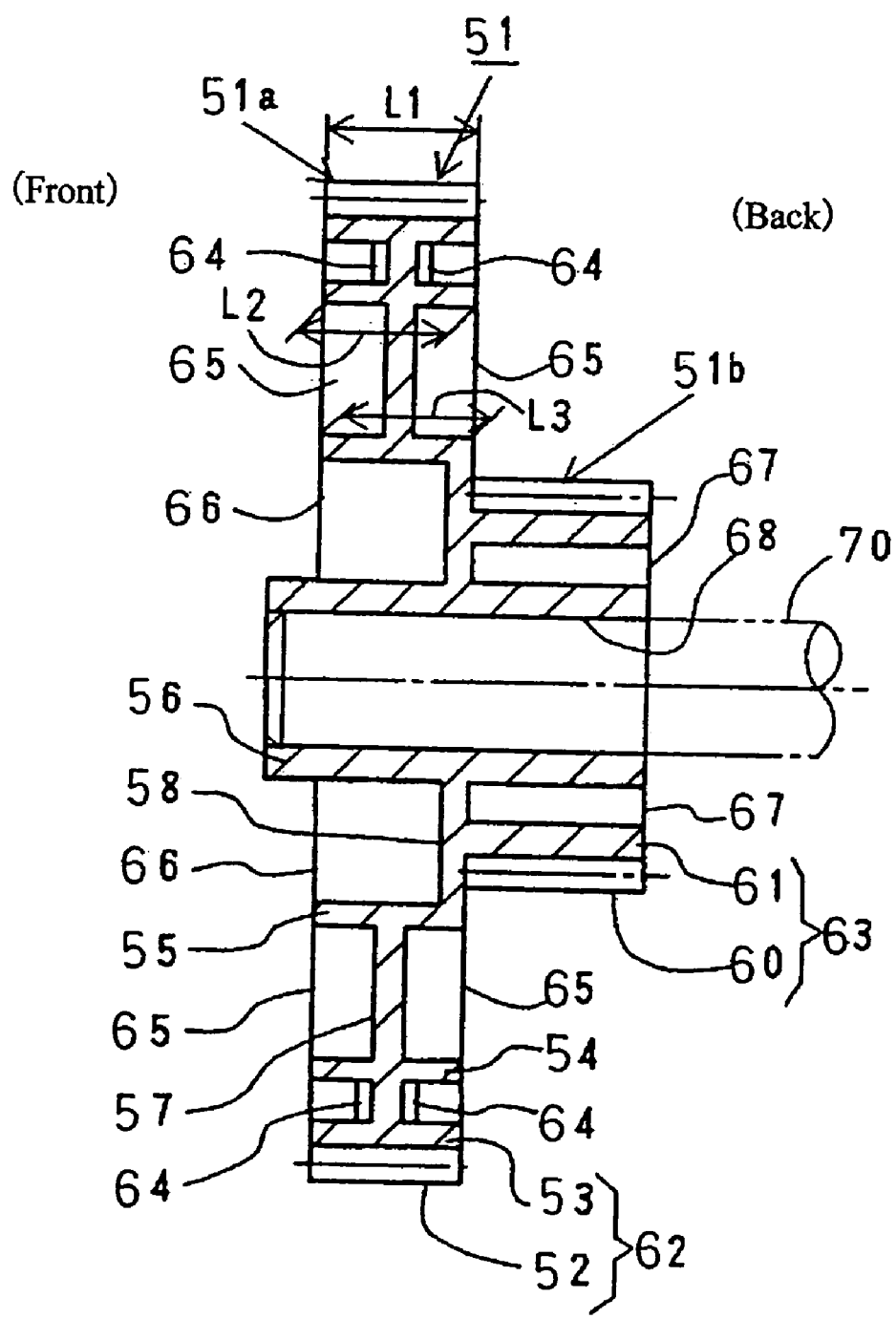
FIG. 27 is a sectional view of the gear, taken along a line B—B in FIG. 26.
Figure 28:
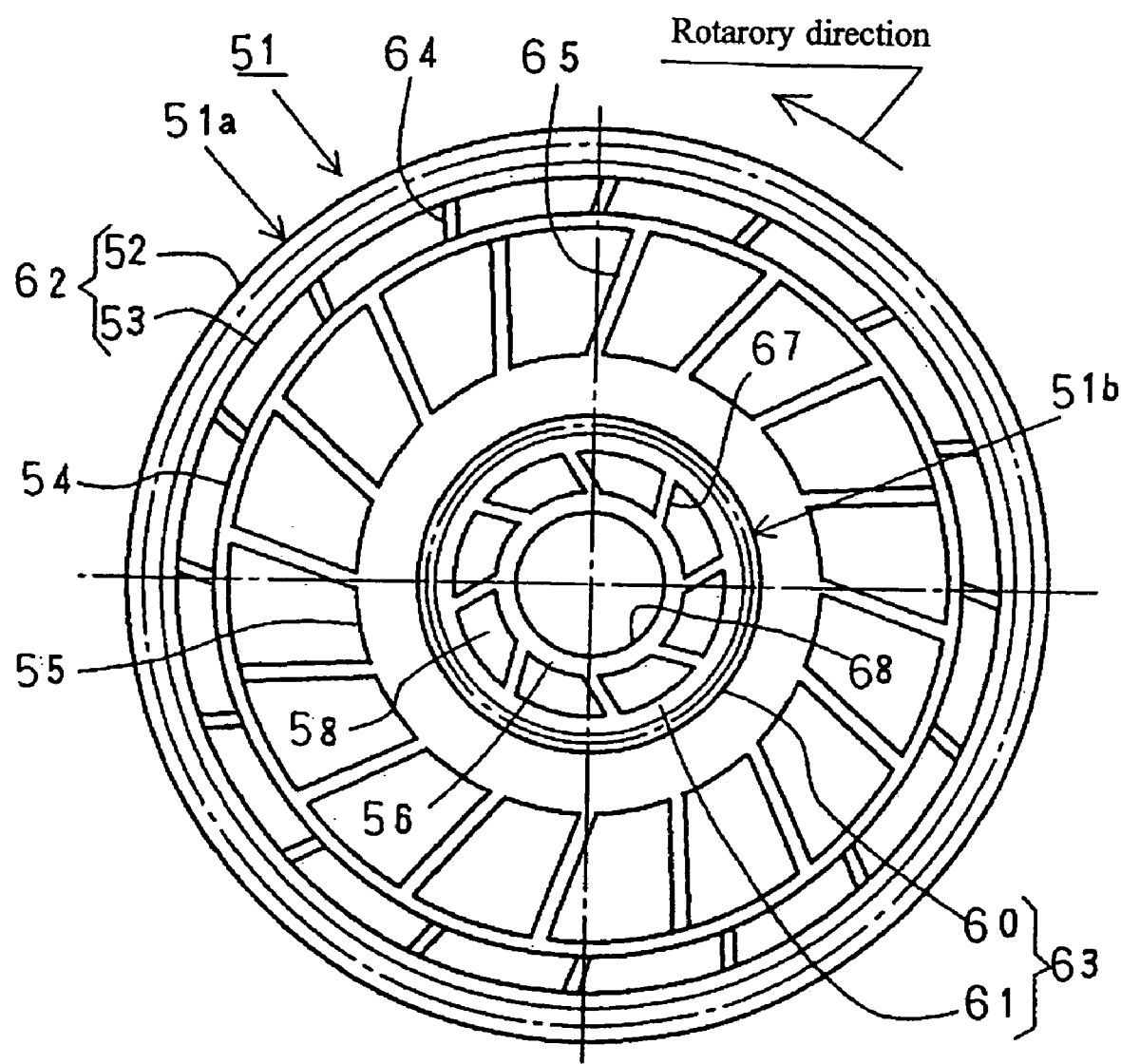
FIG. 28 is a back view of a gear made of a resin according to a fifth embodiment of the present invention.

FIGS. 26 to 28 show a gear 51 made of a resin according to a fourth embodiment of the present invention, which gear 51 comprises two larger and smaller gear sections 51a and 51b. FIG. 26 is a front view (left side view) of the gear 51 made of the resin. FIG. 27 is a sectional view taken along a line B—B in FIG. 26. FIG. 28 is a back view (right side view) of the gear 51 made of the resin.

The gear 51 made of the resin according to the present embodiment includes a first rim 53 having teeth 52 formed around an outer periphery thereof, a first annular circumferential rib 54 formed concentrically with the first rim 53 inside the first rim 53, a second circumferential rib 55 formed concentrically with the first rim 53 inside the first circumferential rib 54, and a cylindrical shaft-supporting section 56 formed inside the second circumferential rib 55. The rim 53 and the first and second circumferential ribs 54 and 55 are connected to one another by a first web 57, and the second circumferential rib 55 and the shaft-supporting section 56 are connected to each other by a second thin plate-shaped web 58. The first and second circumferential ribs 54 and 55 are formed at the same dimension (L=L2=L3) as a teeth width (L1). The first web 57 is formed substantially centrally in a direction of the teeth width, so that it is perpendicular to the first rim 53 and the first and second circumferential ribs 54 and 55. The second web 58 is connected at its outer peripheral end to an end of the second circumferential rib 55 on a back (a right end in FIG. 27) and at its inner peripheral end to an outer periphery of the shaft-supporting section 56, so that it is perpendicular to the second circumferential rib 55 and the shaft-supporting section 56. A second rim 61 having teeth 60 on an outer periphery thereof is formed concentrically with the shaft-supporting section 56 on a side of a back of the second web 58. A first toothed portion 62 is constituted by the teeth 52 and the first rim 53, and a second toothed portion 63 is constituted by the teeth 60 and the second rim 61.

A plurality of diametrical ribs 64 are formed circumferentially on each of opposite sides of the web 57 between the first rim 53 and the first circumferential rib 54 to diametrically connect the first rim 53 and the first circumferential rib 54 to each other. A plurality of diametrical ribs 65 are formed circumferentially on each of opposite sides of the web 57 between the first and second circumferential ribs 54 and 55 to diametrically connect the first and second circumferential ribs 54 and 55 to each other. A plurality of diametrical ribs 66 are formed on a side of the second web 58 between the second circumferential rib 55 and the shaft-supporting section 56 to diametrically connect the second circumferential rib 55 and the shaft-supporting section 56 to each other. Further, a plurality of diametrical ribs 67 are formed on the side of the second web 58 between the second rim 61 and the shaft-supporting section 56 to diametrically connect the second rim 61 and the shaft-supporting section 56 to each other. A shaft 70 is fitted in a shaft hole 68 in the shaft-supporting section 56 for rotation in unison with the latter, or engaged in the shaft hole for rotation relative to each other.

In the gear 51 made of the resin according to the present embodiment, the diametrical ribs 64, 65 and 66 formed on the surfaces of the first and second webs 57 and 58 are inclined in a direction opposite from a direction of rotation of the gear 51, as shown in FIG. 26. As a result, when the first rim 53 in such gear 51 is about to be deformed in the rotational direction due to a torque applied during transmission of a rotational force, so that it is displaced or offset relative to the shaft-supporting section 56, the diametrical ribs 64, 65 and 66 are compressed toward the shaft-supporting section 56, and a reaction force for inhibiting such deformation is applied from the diametrical ribs 64, 65 and 66 to the first rim 53 and the first and second circumferential ribs 54 and 55. Thus, in the gear 51 made of the resin according to the present embodiment, it is possible to inhibit the generation of a phase difference between the rotation on the side of the inner periphery and the rotation on the outer periphery (on the side of the first rim 53), thereby increasing the rotation-transmitting accuracy (dynamic accuracy).

In addition, in the gear 51 made of the resin according to the present embodiment, the diametrical ribs 67 connecting the second rim 61 and the shaft-supporting section 56 to each other are formed so as to be inclined in the rotational direction, as shown in FIG. 28. As a result, when the smaller-diameter gear portion 51b in such gear is meshed with another gear made of a resin (not shown), whereby the rotation is transmitted from the smaller-diameter gear portion 51b to the other gear, a torque is applied to the second rim 61 in a direction opposite from the rotational direction, and even if the second rim 61 is about to be displaced (offset-deformed) in the direction opposite from the rotational direction relative to the shaft-supporting section 56, a reaction force for inhibiting the circumferential deformation of the second rim 61 is applied from the diametrical ribs 67 to the second rim 61. As a result, in the gear 51 made of the resin according to the present embodiment, it is possible to inhibit the generation of a phase difference between the rotation of the second rim 61 and the rotation of the shaft-supporting section 56, thereby enhancing the rotation-transmitting accuracy (dynamic accuracy).

The gear 51 made of the resin according to the present embodiment is formed, so that the thickness values of the first rim 53, the first circumferential rib 54, the second circumferential rib 55, the shaft-supporting section 56, the second rim 61 and the first and second webs 57 and 58 are substantially equal or approximate to one another, and the thickness values of the diametrical ribs 64, 65 and 66 are smaller than those of the first and second circumferential ribs 54 and 55 and those of the first and second webs 57 and 58. In addition, the thickness of the diametrical ribs 67 is smaller than those of the second rim 61 and the shaft-supporting section 56. Moreover, the diametrical ribs 64 connected to the first rim 53 are formed at the height dimension H and the thickness (the width dimension W) smaller than those of the other diametrical ribs 65 and 66 to provide no adverse affection to the accuracy of formation of the first toothed portion 62 and hence, the rigidity of the first web 57 is increased. Therefore, the cooling speeds after the injection molding, are substantially the same at the various portions in the gear 51 made of the resin according to the present embodiment and hence, the contractive deformation after the injection molding is uniformized. In this manner, the gear 51 is formed at a high accuracy. Additionally, in the gear 51 made of the resin according to the present embodiment, the lightening is achieved sufficiently, leading to a reduction in weight and a decreased amount of contractive deformation after the injection molding. Thus, the entire configuration including the first and second toothed portions 62 and 63 can be formed at a high accuracy.

As described above, the gear 51 made of the resin according to the present embodiment is excellent in the static accuracy (tooth-profile accuracy) and also in the dynamic accuracy (the rotation-transmitting accuracy) and hence, it is possible to achieve the smooth and high-accuracy transmission of the rotation.

If the thickness values of the first web 57, the second circumferential rib 55 and the second web 58 are smaller than those of the first rim 53 and the second rim 61, so that the first web 57, the second circumferential rib 55 and the second web 58 are cooled more early than the first rim 53 and the second rim 61, the amount of contractive deformation of the contour dimensions of the larger-diameter gear portion 51a and the smaller-diameter gear portion 51b attendant on the cooling after the injection molding is decreased even if the cooling of the first rim 53 and the second rim 61 is later, whereby the gear 51 can be formed at a further high accuracy.

[Fifth Embodiment]

Figure 29:
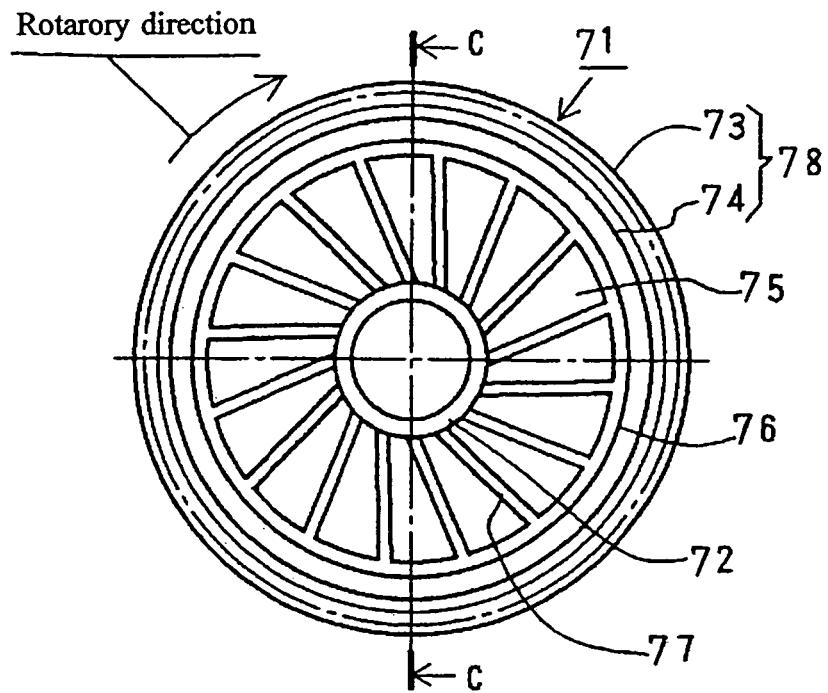
FIG. 29 is a front view of a gear made of a resin according to a sixth embodiment of the present invention.
Figure 30:
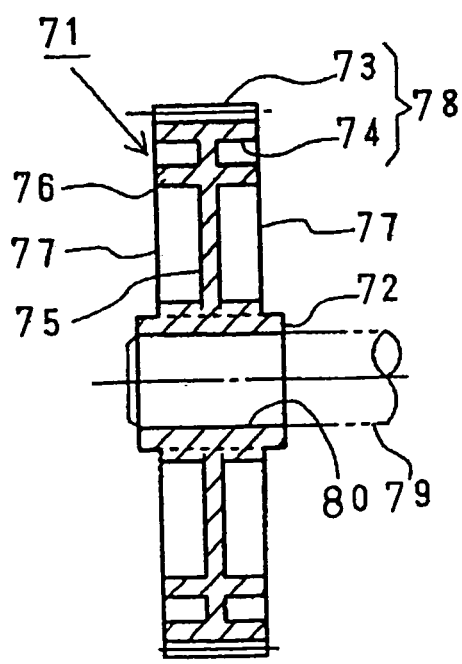
FIG. 30 is a sectional view of the gear, taken along a line C—C in FIG. 29.

FIGS. 29 and 30 show a gear 71 made of a resin according to a fifth embodiment of the present invention. FIG. 29 is a front view of the gear 71 made of the resin, and FIG. 30 is a sectional view taken along a line C—C in FIG. 29.

The gear 71 shown in FIGS. 29 and 30 is of a diameter smaller than those of the gears 21 and 51 according to the first and second embodiments. The gear 71 made of the resin is formed into a laterally symmetric shape with respect to a portion central in a direction of a tooth width, as shown in FIG. 30, in such a manner that a shaft-supporting section 72 and a rim 74 having teeth 73 formed thereon are connected to each other by a thin plate-shaped web 75. An annular circumferential rib 76 is formed concentrically with the rim 74 inside the rim 74, and diametrical ribs 77 are formed on opposite sides of the web 75 between the circumferential rib 76 and the shaft-supporting section 72. The diametrical ribs 77 is formed so as to be inclined in the direction opposite from the direction of rotation of the gear 71, and connected at its upper end to the circumferential rib 76 and at its lower end to the shaft-supporting section 77. A toothed portion 78 is constituted by the teeth 73 and the rim 74.

In this case, the rim 74, the circumferential rib 76 and the web 75 are formed at the substantially same thickness, and the diametrical ribs 77 are formed at a thickness smaller than those of the rim 74, the circumferential rib 76 and the web 75, so that the toothed portion 78 is formed with a high accuracy.

In the gear 71 having a structure as described above, a shaft hole 80 in the shaft-supporting section 72 is fitted over a shaft 79 for rotation in unison with the shaft, and when the rotation is transmitted to the shaft 79, the rim 74 is about to be moved in the rotational direction by a torque applied from the outside, so that it is displaced relative to the shaft-supporting section 72. However, the diametrical rib 77 resists such movement in a thrusting manner, thereby inhibiting the generation of a phase difference between the rotation of the rim 74 and the rotation of the shaft-supporting portion 72. Therefore, the gear 71 made of the resin according to the present embodiment is capable of transmitting the rotation to the shaft 79 smoothly and with a good accuracy.

[Sixth Embodiment]

Figure 31:
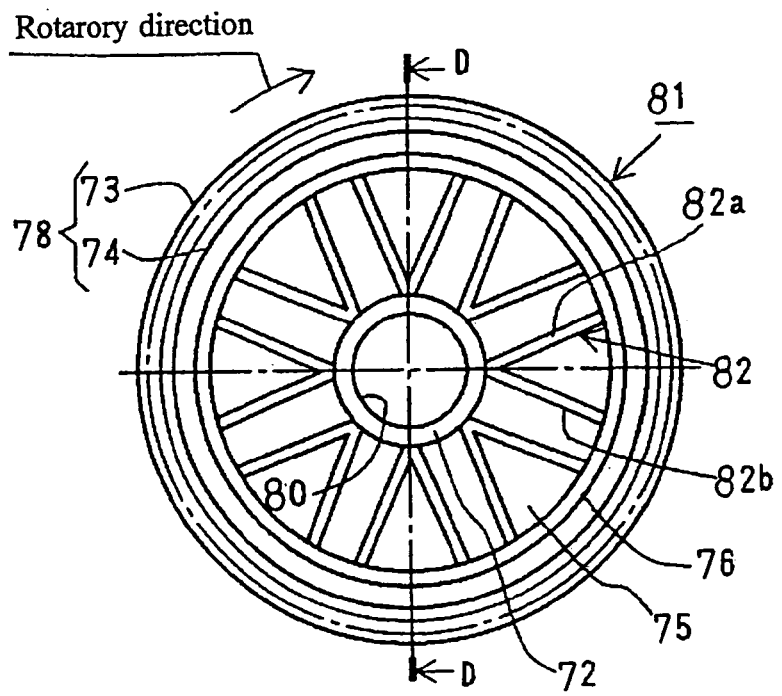
FIG. 31 is a front view of a gear made of a resin according to a seventh embodiment of the present invention.
Figure 32:
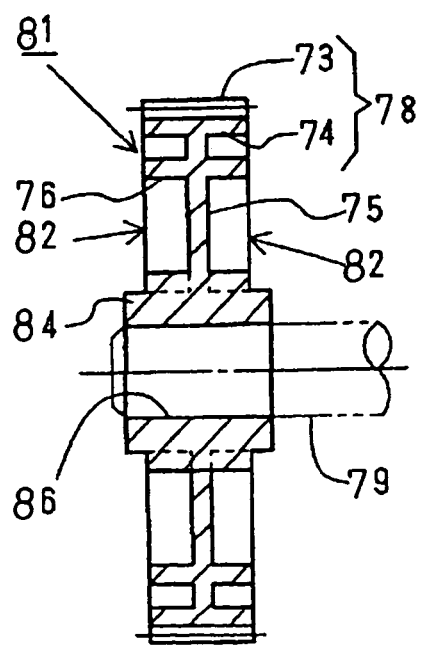
FIG. 32 is a sectional view of the gear, taken along a line D—D in FIG. 31.

FIGS. 31 and 32 show a gear 81 made of a resin according to a sixth embodiment of the present invention. FIG. 31 is a front view of the gear 81 made of the resin, and FIG. 32 is a sectional view taken along a line D—D in FIG. 31. The structure of the gear 81 made of the resin according to the sixth embodiment is similar to that of the gear 71 made of the resin according to the fifth embodiment except for diametrical ribs 82 and hence, portions or components corresponding to those in the fifth embodiment are designated by like reference characters in FIGS. 31 and 32, and the duplicated description is omitted.

More specifically, the gear 81 made of the resin and shown in FIGS. 31 and 32 is used for transmitting the rotation in both of normal and opposite directions. Substantially V-shaped diametrical ribs 82 are formed on a side of a web 75 between a circumferential rib 76 and a shaft-supporting section 72 and connected at its ends to the shaft-supporting section 72 and the circumferential rib 76, respectively, thereby increasing the rigidity of the web 75. Specifically, each of the diametrical ribs 82 comprises a first diametrical rib portion 82a formed to extend obliquely in a direction opposite from a normal direction of rotation of the gear 81 made of the resin, and a second diametrical rib portion 82b formed to extend obliquely in a direction opposite from the opposite direction of rotation of the gear 81.

The gear 81 constructed in the above manner is capable of transmitting the rotations in the normal and opposite directions smoothly and with a high accuracy to a shaft 79 fitted in a shaft hole 80 in the shaft-supporting section 72 for rotation in unison with the latter.

Figure 33A:
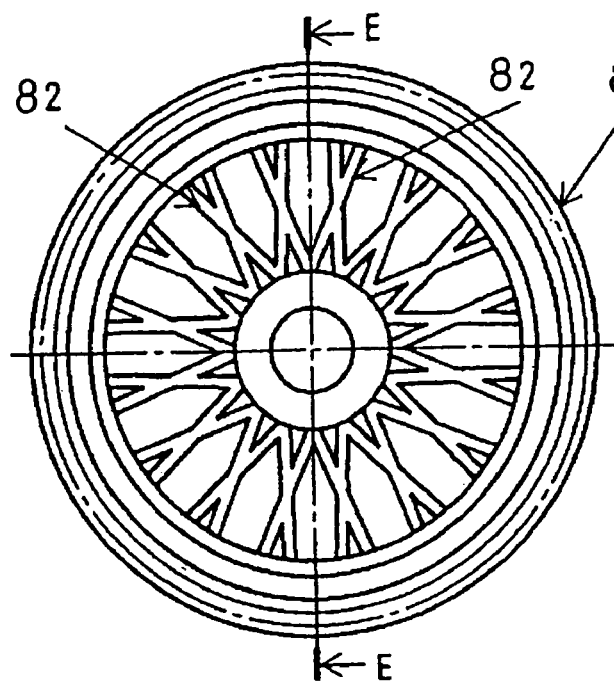
FIG. 33a is a front view of the gear made of the resin.
Figure 33B:
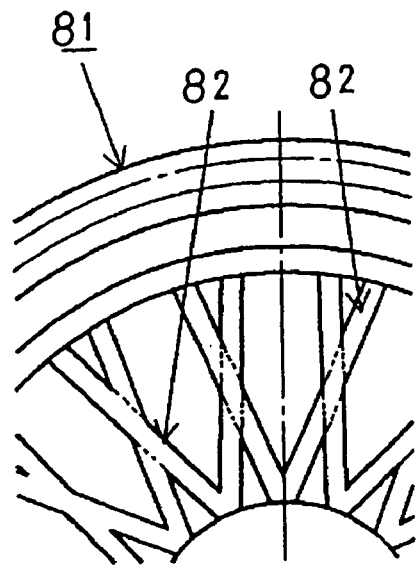
Figure 34:
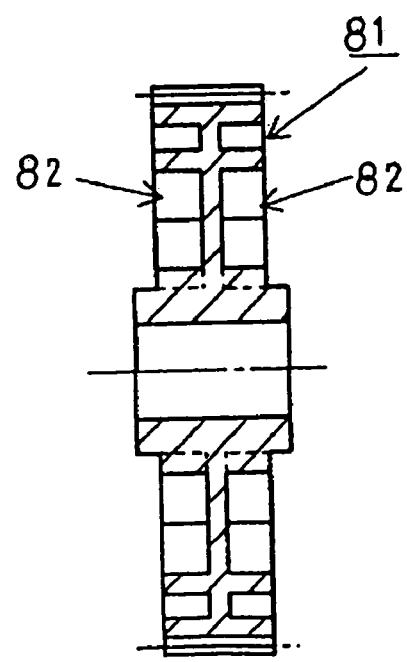

If the substantially V-shaped diametrical ribs 82 are disposed more closely than that in the embodiment shown in FIG. 31 in the gear 81 made of the resin as shown in FIGS. 33 and 44 to further increase the rigidity of the web 75, the rotation can be transmitted further smoothly and with a high accuracy.

(Image Forming Device)

[Seventh Embodiment]

Figure 35:
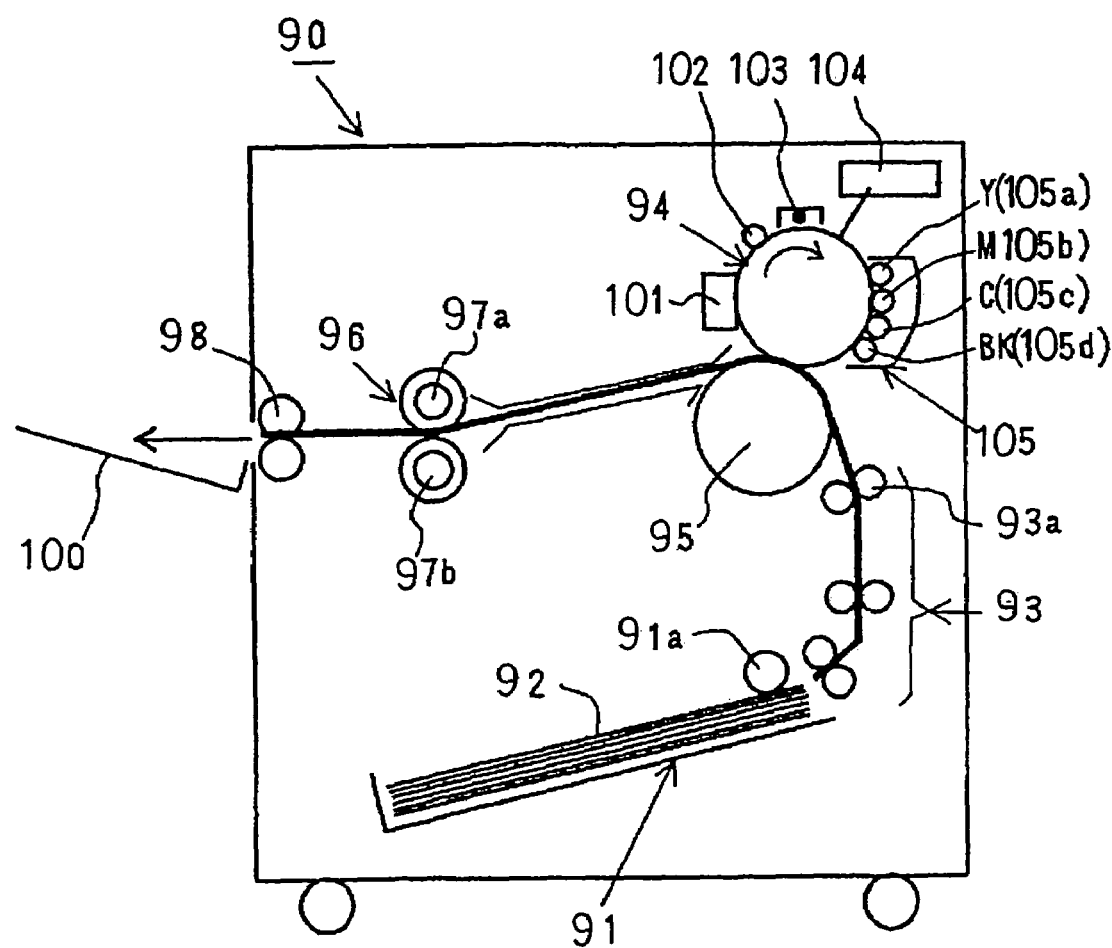
FIG. 35 is a schematic diagram of an image-forming device.

FIG. 35 shows a color duplicator (an image forming device) 90 using any of the gears 51, 71 and 81 made of the resin according to the above-described embodiments.

The image-forming device 90 shown in FIG. 35 is designed, so that a sheet material 92 fed out of a paper-feeding section 91 is fed by a sheet-transporting section 93 to between a photoconductor 94 and a transfer roller 95, where a color image formed on the photoconductor 94 is transferred onto the sheet material 92; the sheet material 92 is then fed to between fixing rollers 97a and 97b of a fixing section 96, where the color image formed on the surface of the sheet material 92 is fixed; and the sheet material 92 resulting from the completion of the fixing operation is discharged onto a paper-discharge tray 100 by a pair of paper-discharge rollers 28.

Figure 36:
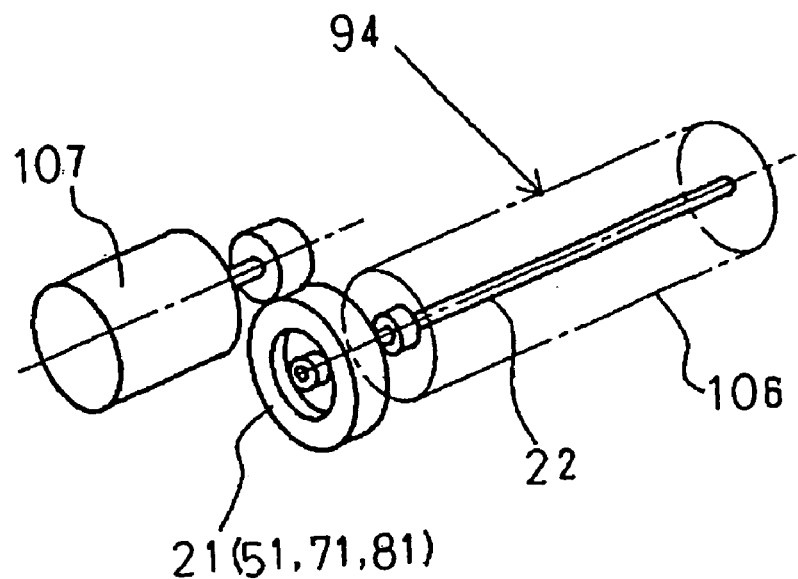
FIG. 36 is a diagram showing a mechanism for driving a photoconductor drum.

The photoconductor 94 is adapted to be rotated in a clockwise direction (in a direction indicated by an arrow) as viewed in FIG. 35, and a cleaning unit 101, an antistatic lamp 102, an electrostatic charger 103, an exposing unit 104 and a color developing unit 105 are disposed around the photoconductor 24. In the photoconductor 24, for example, a photoconductor-driving shaft 22 fixed at the center of rotation of a photoconductor drum 106 is disposed in engagement with the shaft-supporting section 24, 56 or 72 of the gear 21, 51, 71 or 81 made of the resin according to any of the above-described embodiments, as shown in FIG. 36, so that it can be rotated in unison with the shaft-supporting section 24, 56 or 72 by a motor 107 as a drive means connected to the gear 21, 51, 71 or 81 of made of the resin, and color images comprising four colors: yellow (Y), magenta (M), cyan (C) and black (BK) in the color developing unit 105 are formed in a superimposed manner on the photoconductor 94.

In the image-forming device 90 having such arrangement, the rotation of the motor 107 is transmitted smoothly and with a high accuracy to the photoconductor 104 through the gear 21, 51, 71 or 81 made of the resin. Therefore, a variation in angular speed of rotation of the photoconductor 94 is inhibited, and the misalignment of the color images formed on the photoconductor 94 is inhibited, thereby enabling the printing of a clear or distinct color image. Moreover, the gear 51, 71 or 81 according to the above-described embodiment used for transmission of the rotation has the large rigidity such that the vibration can be reduced and hence, the generation of a noise due to the vibration can be inhibited to enable the quiet formation of the image.

Figure 37:
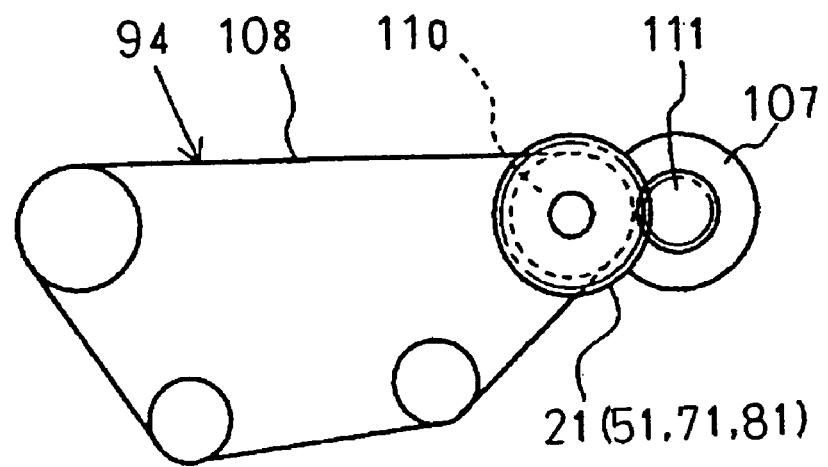
FIG. 37 is a diagram showing a mechanism for driving a photoconductor belt.

In such embodiment, the photoconductor drum 106 has been illustrated as the photoconductor 94, but the photoconductor 94 is not limited to the photoconductor drum 106, and a photoconductor belt may be used as the photoconductor 94. More specifically, as shown in FIG. 37, the gear 21, 51, 71 or 81 made of the resin according to any of the above-described embodiments may be connected to a roller 110 for driving the photoconductor belt 108, so that it can be rotated in unison with the roller 110, and a gear (a gear made of a resin) 111 of the motor 107 may be meshed with the gear 21, 51, 71 or 81 made of the resin, so that the rotation of the motor 107 may be transmitted to the driving roller 110 through the gear 111 and the gear 21, 51, 71 or 81 made of the resin to turn the photoconductor belt 108 smoothly and with a good accuracy. Even with such an arrangement, an effect similar to that in the above-described embodiment can be provided.

The above-described embodiment has been illustrated as the arrangement using the gear 21, 51, 71 or 81 made of the resin according to any of the above-described embodiments for driving the photoconductor 94, but the present invention is not limited to such arrangement, and the gear 21, 51, 71 or 81 made of the resin according to any of the above-described embodiments may be used properly as a driving gear, a rotation-transmitting idle gear or the like for a paper-feeding roller 91a in the paper-feeding section 91, a resist roller 93a in the sheet-transporting section 93, developing rollers 105a, 105b, 105c and 105d in the color developing unit 105, fixing rollers 97a and 97b and the like. Further, the present invention is not limited to the above embodiment, and in a case of an image-forming device (not shown) having an arrangement using an intermediate transfer member, the gear 21, 51, 71 or 81 made of the resin according to any of the above-described embodiments can be used for driving the intermediate transfer member.

The gear 21, 51, 71 or 81 made of the resin according to any of the above-described embodiments has been illustrated as being used in the image-forming device 90 such as a duplicator, a printer, a facsimile and the like, as described above, but the present invention is not limited to such image-forming device 20, and the gear 21, 51, 71 or 81 made of the resin according to any of the above-described embodiments is applicable widely to an ink-jet printer, an automobile part and many other precision machines to enable the rotation to be transmitted smoothly and with a high accuracy.

The gear 21, 51, 71 or 81 made of the resin has been illustrated in any of the above-described embodiments, but the present invention is not limited to such gear and is applicable widely to any other gear such as helical gear, a bevel gear, a worm gear, an internal-tooth gear and the like.

In addition, the present invention is not limited to the gear, and is applicable to a pulley made of a resin as a rotation-transmitting means made of a resin and having teeth meshed with a timing belt.

Further, the gear 21, 51, 71 or 81 made of the resin according to any of the above-described embodiments can be used in engagement with a shaft for rotation relative to each other to rotate the rotation to another gear made of a resin.

Although the embodiments of the present invention have been described in detail, it will be understood that the present invention is not limited to the above-described embodiments, and various modifications in design may be made without departing from the spirit and scope of the invention defined in claims.

What is claimed is:

1. A gear made of a resin, comprising a substantially annular toothed portion formed at a radially outer location, a shaft-supporting section formed at a radially inner location around a rotational center of said toothed portion, a web connecting said shaft-supporting section and said tooted portion to each other, wherein
said web has a circumferential rib formed thereon concentrically with said toothed portion, radial ribs radially extending to connect the circumferential rib and said shaft-supporting section to each other, and a cross brace formed thereon on the side of an inner peripheral surface of said circumferential rib with said cross brace inclininging extending towards said rotational center.

2. An image-forming device comprising a gear made of a resin according to claim 1, and a drive means for driving a photoconductor in rotation through said gear made of the resin.

3. A gear made of a resin comprising a substantially cylindrical toothed portion formed at a radially outer location, a shaft-supporting section formed at a radially inner location around a rotational center of the toothed portion, and a thin plate-shaped web connecting said shaft-supporting section and said toothed portion to each other, wherein said web has a first circumferential rib formed thereon concentrically with said toothed portion inside said toothed portion, a second circumferential rib formed thereon concentrically with said first circumferential rib inside said first circumferential rib, and a plurality of radially extending ribs formed to connect said second circumferential rib and said first circumferential rib to each other along a side of the web, each of said radially extending ribs comprising a first radial rib portion formed to extend obliquely in a direction opposite from a normal rotational direction from an outer periphery of said second circumferential rib, and a second radial rib portion formed to extend obliquely in a direction opposite from an opposite rotational direction from the outer periphery of said second circumferential rib.

4. An image-forming device comprising a gear made of a resin according to claim 3, and a drive means for driving a photoconductor in rotation through said gear made of the resin.

5. A rotation-transmitting means made of a resin, comprising a substantially annular toothed portion formed at a radially outer location, a shaft-supporting section formed at a radially inner location around a rotational center of the toothed portion, and a thin plate-shaped web connecting said shaft-supporting section and said toothed portion to each other, wherein said web has a circumferential rib formed thereon concentrically with said toothed portion, radial ribs radially extending to connect said circumferential rib and said shaft-supporting section to each other, and a cross brace formed thereon on the side of an inner peripheral surface of said circumferential rib with said cross brace inclininlgy extending toward said rotation center.

* * * * *